(12) United States Patent
Johnson et al.

(10) Patent No.: US 9,747,622 B1
(45) Date of Patent: Aug. 29, 2017

(54) POINT-AND-SHOOT PRODUCT LISTER

(75) Inventors: Peter K. Johnson, Salt Lake City, UT (US); J. Doug Minnick, Salt Lake City, UT (US); Ian Robertson, Salt Lake City, UT (US); Samuel J. Peterson, Salt Lake City, UT (US)

(73) Assignee: Overstock.com, Inc., Midvale, UT (US)

( * ) Notice: Subject to any disclaimer, the term of this patent is extended or adjusted under 35 U.S.C. 154(b) by 445 days.

(21) Appl. No.: 12/410,235

(22) Filed: Mar. 24, 2009

(51) Int. Cl.
*G06Q 30/00* (2012.01)
*G06F 17/30* (2006.01)
*G06Q 30/06* (2012.01)

(52) U.S. Cl.
CPC ..... *G06Q 30/0601* (2013.01); *G06Q 30/0613* (2013.01); *G06Q 30/0641* (2013.01)

(58) Field of Classification Search
CPC .......... G06Q 30/0601; G06Q 30/0613; G06Q 30/0641
USPC .............................. 705/26.1–27.2
See application file for complete search history.

(56) References Cited

U.S. PATENT DOCUMENTS

| | | | |
|---|---|---|---|
| 3,573,747 A | 4/1971 | Adams et al. | |
| 3,581,072 A | 5/1971 | Nymeyer | |
| 4,412,287 A | 10/1983 | Braddock, III | |
| 4,674,044 A | 6/1987 | Kalmus et al. | |
| 4,677,552 A | 6/1987 | Sibley, Jr. | |
| 4,789,928 A | 12/1988 | Fujisaki | |
| 4,799,156 A | 1/1989 | Shavit et al. | |
| 4,808,987 A | 2/1989 | Takeda et al. | |
| 4,823,265 A | 4/1989 | Nelson | |
| 4,854,516 A | 8/1989 | Yamada | |
| 4,903,201 A | 2/1990 | Wagner | |
| RE33,316 E | 8/1990 | Katsuta et al. | |
| 5,027,110 A | 6/1991 | Chang et al. | |
| 5,053,956 A | 10/1991 | Donald et al. | |

(Continued)

FOREIGN PATENT DOCUMENTS

| | | |
|---|---|---|
| CA | 2253543 | 10/1997 |
| CA | 2347812 | 5/2000 |

(Continued)

OTHER PUBLICATIONS

2ROAM, Inc., multiple archived pages of www.2roam.com retrieved via Internet Archive Wayback Machine on Jun. 10, 2008.

(Continued)

*Primary Examiner* — Kathleen Palavecino
(74) *Attorney, Agent, or Firm* — Clayton Howarth, P.C.

(57) ABSTRACT

Listing content is transmitted from a wireless mobile device to a server, where it is automatically posted in a listing database and made available on a network, such as the Internet, to third parties. The listing content may include both image data, captured by an integrated camera of the wireless mobile device, and text data, input by a user of the wireless mobile device. The wireless mobile device may provide an interface on its display to facilitate the capture of the listing content in discrete data components. After capture, the discrete data components for a single listing may be automatically associated together such that it is unnecessary for a user to manually associate them. The captured listing content may be automatically transmitted to the server in response to a single user selection received through the interface on the wireless mobile device.

35 Claims, 11 Drawing Sheets

(56) References Cited

U.S. PATENT DOCUMENTS

| | | |
|---|---|---|
| 5,063,507 A | 11/1991 | Lindsey et al. |
| 5,077,665 A | 12/1991 | Silverman et al. |
| 5,101,353 A | 3/1992 | Lupien et al. |
| 5,136,501 A | 8/1992 | Silverman et al. |
| 5,168,446 A | 12/1992 | Wiseman |
| 5,205,200 A | 4/1993 | Wright |
| 5,243,515 A | 9/1993 | Lee |
| 5,258,908 A | 11/1993 | Hartheimer et al. |
| 5,280,422 A | 1/1994 | Moe et al. |
| 5,297,031 A | 3/1994 | Gutterman et al. |
| 5,297,032 A | 3/1994 | Trojan et al. |
| 5,301,350 A | 4/1994 | Rogan et al. |
| 5,305,200 A | 4/1994 | Hartheimer et al. |
| 5,325,297 A | 6/1994 | Bird et al. |
| 5,329,589 A | 7/1994 | Fraser et al. |
| 5,347,632 A | 9/1994 | Filepp et al. |
| 5,375,055 A | 12/1994 | Togher et al. |
| 5,394,324 A | 2/1995 | Clearwater |
| 5,407,433 A | 4/1995 | Loomas |
| 5,411,483 A | 5/1995 | Loomas et al. |
| 5,426,281 A | 6/1995 | Abecassis |
| 5,485,510 A | 1/1996 | Colbert |
| 5,493,677 A | 2/1996 | Balogh et al. |
| 5,553,145 A | 9/1996 | Micali |
| 5,557,728 A | 9/1996 | Garrett et al. |
| 5,579,471 A | 11/1996 | Barber et al. |
| 5,596,994 A | 1/1997 | Bro |
| 5,598,557 A | 1/1997 | Doner et al. |
| 5,640,569 A | 6/1997 | Miller et al. |
| 5,657,389 A | 8/1997 | Houvener |
| 5,664,111 A | 9/1997 | Nahan et al. |
| 5,664,115 A | 9/1997 | Fraser |
| 5,689,652 A | 11/1997 | Lupien et al. |
| 5,694,546 A | 12/1997 | Reisman |
| 5,706,457 A | 1/1998 | Dwyer et al. |
| 5,710,889 A | 1/1998 | Clark et al. |
| 5,715,314 A | 2/1998 | Payne et al. |
| 5,715,402 A | 2/1998 | Popolo |
| 5,717,989 A | 2/1998 | Tozzoli et al. |
| 5,721,908 A | 2/1998 | Lagarde et al. |
| 5,722,418 A | 3/1998 | Bro |
| 5,727,165 A | 3/1998 | Ordish et al. |
| 5,737,599 A | 4/1998 | Rowe et al. |
| 5,760,917 A | 6/1998 | Sheridan |
| 5,761,496 A | 6/1998 | Hattori |
| 5,761,655 A | 6/1998 | Hoffman |
| 5,761,662 A | 6/1998 | Dasan |
| 5,771,291 A | 6/1998 | Newton et al. |
| 5,771,380 A | 6/1998 | Tanaka et al. |
| 5,778,367 A | 7/1998 | Wesinger, Jr. et al. |
| 5,790,790 A | 8/1998 | Smith et al. |
| 5,794,216 A | 8/1998 | Brown |
| 5,794,219 A | 8/1998 | Brown |
| 5,796,395 A | 8/1998 | de Hond |
| 5,799,285 A | 8/1998 | Klingman |
| 5,803,500 A | 9/1998 | Mossberg |
| 5,818,914 A | 10/1998 | Fujisaki |
| 5,826,244 A | 10/1998 | Huberman |
| 5,835,896 A | 11/1998 | Fisher et al. |
| 5,845,265 A | 12/1998 | Woolston |
| 5,845,266 A | 12/1998 | Lupien et al. |
| 5,850,442 A | 12/1998 | Muftic |
| 5,870,754 A | 2/1999 | Dimitrova et al. |
| 5,872,848 A | 2/1999 | Romney et al. |
| 5,873,069 A | 2/1999 | Reuhl et al. |
| 5,873,080 A | 2/1999 | Coden et al. |
| 5,884,056 A | 3/1999 | Steele |
| 5,890,138 A | 3/1999 | Godin et al. |
| 5,890,175 A | 3/1999 | Wong et al. |
| 5,905,975 A | 5/1999 | Ausubel |
| 5,907,547 A | 5/1999 | Foladare et al. |
| 5,913,215 A | 6/1999 | Rubinstein et al. |
| 5,922,074 A | 7/1999 | Richard et al. |
| 5,924,072 A | 7/1999 | Havens |
| 5,926,794 A | 7/1999 | Fethe |
| 5,948,040 A | 9/1999 | DeLorme et al. |
| 5,948,061 A | 9/1999 | Merriman et al. |
| 5,974,412 A | 10/1999 | Hazlehurst et al. |
| 5,986,662 A | 11/1999 | Argiro et al. |
| 5,987,446 A | 11/1999 | Corey et al. |
| 5,991,739 A | 11/1999 | Cupps et al. |
| 5,999,915 A | 12/1999 | Nahan et al. |
| 6,012,053 A | 1/2000 | Pant et al. |
| 6,029,141 A | 2/2000 | Bezos et al. |
| 6,035,288 A | 3/2000 | Solomon |
| 6,035,402 A | 3/2000 | Vaeth et al. |
| 6,044,363 A | 3/2000 | Mori et al. |
| 6,045,447 A | 4/2000 | Yoshizawa et al. |
| 6,047,264 A | 4/2000 | Fisher et al. |
| 6,055,518 A | 4/2000 | Franklin et al. |
| 6,058,379 A | 5/2000 | Odom et al. |
| 6,058,417 A | 5/2000 | Hess et al. |
| 6,058,428 A | 5/2000 | Wang et al. |
| 6,061,448 A | 5/2000 | Smith et al. |
| 6,065,041 A | 5/2000 | Lum et al. |
| 6,070,125 A | 5/2000 | Murphy et al. |
| 6,073,117 A | 6/2000 | Oyanagi et al. |
| 6,078,914 A | 6/2000 | Redfern |
| 6,085,176 A | 7/2000 | Woolston |
| 6,104,815 A | 8/2000 | Alcorn et al. |
| 6,119,137 A | 9/2000 | Smith et al. |
| 6,128,649 A | 10/2000 | Smith et al. |
| 6,141,010 A | 10/2000 | Hoyle |
| 6,167,382 A | 12/2000 | Sparks et al. |
| 6,178,408 B1 | 1/2001 | Copple et al. |
| 6,185,558 B1 | 2/2001 | Bowman et al. |
| 6,192,407 B1 | 2/2001 | Smith et al. |
| 6,199,077 B1 | 3/2001 | Inala et al. |
| 6,202,051 B1 | 3/2001 | Woolston |
| 6,202,061 B1 | 3/2001 | Khosla et al. |
| 6,226,412 B1 | 5/2001 | Schwab |
| 6,243,691 B1 | 6/2001 | Fisher et al. |
| 6,269,238 B1 | 7/2001 | Iggulden |
| 6,271,840 B1 | 8/2001 | Finseth et al. |
| 6,275,820 B1 | 8/2001 | Navin-Chandra et al. |
| 6,275,829 B1 | 8/2001 | Angiulo et al. |
| 6,356,879 B2 | 3/2002 | Aggarwal et al. |
| 6,356,905 B1 | 3/2002 | Gershman et al. |
| 6,356,908 B1 | 3/2002 | Brown et al. |
| 6,366,899 B1 | 4/2002 | Kernz |
| 6,370,527 B1 | 4/2002 | Singhal |
| 6,373,933 B1 | 4/2002 | Sarkki et al. |
| 6,374,260 B1 | 4/2002 | Hoffert et al. |
| 6,381,510 B1 | 4/2002 | Amidhozour et al. |
| 6,415,320 B1 | 7/2002 | Hess et al. |
| 6,434,556 B1 | 8/2002 | Levin et al. |
| 6,456,307 B1 | 9/2002 | Bates et al. |
| 6,460,020 B1 | 10/2002 | Pool et al. |
| 6,466,917 B1 | 10/2002 | Goyal et al. |
| 6,484,149 B1 | 11/2002 | Jammes et al. |
| 6,489,968 B1 | 12/2002 | Ortega et al. |
| 6,522,955 B1 | 2/2003 | Colborn |
| 6,523,037 B1 | 2/2003 | Monahan et al. |
| 6,601,061 B1 | 7/2003 | Holt et al. |
| 6,604,107 B1 | 8/2003 | Wang |
| 6,625,764 B1 | 9/2003 | Dawson |
| 6,643,696 B2 | 11/2003 | Davis et al. |
| 6,661,431 B1 | 12/2003 | Stuart et al. |
| 6,665,838 B1 | 12/2003 | Brown et al. |
| 6,701,310 B1 | 3/2004 | Sugiura et al. |
| 6,718,536 B2 | 4/2004 | Dupaquis |
| 6,725,268 B1 | 4/2004 | Jackel et al. |
| 6,728,704 B2 | 4/2004 | Mao et al. |
| 6,732,161 B1 | 5/2004 | Hess et al. |
| 6,732,162 B1 | 5/2004 | Wood et al. |
| 6,856,963 B1 | 2/2005 | Hurwitz |
| 6,889,054 B2 | 5/2005 | Himmel et al. |
| 7,043,450 B2 | 5/2006 | Velez et al. |
| 7,069,242 B1 | 6/2006 | Sheth et al. |
| 7,076,453 B2 | 7/2006 | Jammes et al. |
| 7,076,504 B1 | 7/2006 | Handel et al. |
| 7,080,030 B2 | 7/2006 | Eglen et al. |
| 7,100,111 B2 | 8/2006 | McElfresh et al. |
| 7,100,195 B1 | 8/2006 | Underwood |

(56) References Cited

U.S. PATENT DOCUMENTS

| | | |
|---|---|---|
| 7,117,207 B1 | 10/2006 | Kerschberg et al. |
| 7,127,416 B1 | 10/2006 | Tenorio |
| 7,165,091 B2 | 1/2007 | Lunenfeld |
| 7,167,910 B2 | 1/2007 | Farnham et al. |
| 7,216,115 B1 | 5/2007 | Walters et al. |
| 7,254,547 B1 | 8/2007 | Beck et al. |
| 7,318,037 B2 | 1/2008 | Solari |
| 7,324,966 B2 | 1/2008 | Scheer |
| 7,340,249 B2 | 3/2008 | Moran et al. |
| 7,349,668 B2 | 3/2008 | Ilan et al. |
| 7,353,188 B2 | 4/2008 | Yim et al. |
| 7,366,755 B1 | 4/2008 | Cuomo et al. |
| 7,379,890 B2 | 5/2008 | Myr et al. |
| 7,380,217 B2 | 5/2008 | Gvelesiani |
| 7,401,025 B1 | 7/2008 | Lokitz |
| 7,447,646 B1 | 11/2008 | Agarwal et al. |
| 7,454,464 B2 | 11/2008 | Puthenkulam et al. |
| 7,457,730 B2 | 11/2008 | Degnan |
| 7,493,521 B1 | 2/2009 | Li et al. |
| 7,496,582 B2 | 2/2009 | Farnham et al. |
| 7,516,094 B2 | 4/2009 | Perkowski |
| 7,539,696 B1 | 5/2009 | Greener et al. |
| 7,546,625 B1 | 6/2009 | Kamangar |
| 7,552,067 B2 | 6/2009 | Nephew et al. |
| 7,565,615 B2 | 7/2009 | Ebert |
| 7,606,743 B2 | 10/2009 | Orzell et al. |
| 7,610,212 B2 | 10/2009 | Klett et al. |
| 7,653,573 B2 | 1/2010 | Hayes, Jr. et al. |
| 7,834,883 B2 | 11/2010 | Adams |
| 7,912,748 B1 | 3/2011 | Rosenberg et al. |
| 7,983,950 B2 | 7/2011 | DeVita |
| 8,112,303 B2 | 2/2012 | Eglen et al. |
| 8,140,989 B2 | 3/2012 | Cohen et al. |
| 8,260,852 B1 | 9/2012 | Cselle |
| 8,494,912 B2 | 7/2013 | Fraser et al. |
| 8,577,740 B1 | 11/2013 | Murray et al. |
| 8,693,494 B2 | 4/2014 | Fiatal |
| 2001/0034667 A1 | 10/2001 | Petersen |
| 2001/0034668 A1 | 10/2001 | Whitworth |
| 2001/0044751 A1 | 11/2001 | Pugliese et al. |
| 2001/0047290 A1 | 11/2001 | Petras et al. |
| 2001/0047308 A1 | 11/2001 | Kaminsky et al. |
| 2001/0051996 A1 | 12/2001 | Cooper et al. |
| 2002/0002513 A1 | 1/2002 | Chiasson |
| 2002/0007356 A1 | 1/2002 | Rice et al. |
| 2002/0013721 A1 | 1/2002 | Capel et al. |
| 2002/0022995 A1 | 2/2002 | Miller et al. |
| 2002/0023059 A1 | 2/2002 | Bari et al. |
| 2002/0026390 A1 | 2/2002 | Ulenas et al. |
| 2002/0029187 A1 | 3/2002 | Meehan et al. |
| 2002/0038312 A1 | 3/2002 | Donner et al. |
| 2002/0040352 A1 | 4/2002 | McCormick |
| 2002/0042738 A1 | 4/2002 | Srinivasan et al. |
| 2002/0099578 A1 | 7/2002 | Eicher et al. |
| 2002/0099579 A1 | 7/2002 | Scelzo et al. |
| 2002/0099602 A1 | 7/2002 | Moskowitz et al. |
| 2002/0107718 A1 | 8/2002 | Morrill et al. |
| 2002/0120537 A1 | 8/2002 | Campbell et al. |
| 2002/0129282 A1 | 9/2002 | Hopkins |
| 2002/0147625 A1 | 10/2002 | Kolke, Jr. |
| 2002/0161648 A1 | 10/2002 | Mason et al. |
| 2002/0188777 A1 | 12/2002 | Kraft et al. |
| 2002/0198784 A1 | 12/2002 | Shaak et al. |
| 2003/0004855 A1 | 1/2003 | Dutta et al. |
| 2003/0005046 A1 | 1/2003 | Kavanagh et al. |
| 2003/0009362 A1 | 1/2003 | Cifani et al. |
| 2003/0009392 A1 | 1/2003 | Perkowski |
| 2003/0014400 A1 | 1/2003 | Siegel |
| 2003/0028605 A1 | 2/2003 | Millett et al. |
| 2003/0032409 A1 | 2/2003 | Hutcheson et al. |
| 2003/0035138 A1 | 2/2003 | Schilling |
| 2003/0036914 A1 | 2/2003 | Fitzpatrick et al. |
| 2003/0040970 A1 | 2/2003 | Miller |
| 2003/0041008 A1 | 2/2003 | Grey et al. |
| 2003/0046149 A1 | 3/2003 | Wong |
| 2003/0069740 A1 | 4/2003 | Zeidman |
| 2003/0069790 A1 | 4/2003 | Kane |
| 2003/0069825 A1 | 4/2003 | Burk et al. |
| 2003/0088467 A1 | 5/2003 | Culver |
| 2003/0088511 A1 | 5/2003 | Karboulonis et al. |
| 2003/0093331 A1 | 5/2003 | Childs et al. |
| 2003/0110100 A1 | 6/2003 | Wirth, Jr. |
| 2003/0119492 A1 | 6/2003 | Timmins et al. |
| 2003/0131095 A1 | 7/2003 | Kumhyr et al. |
| 2003/0139969 A1 | 7/2003 | Scroggie et al. |
| 2003/0158792 A1 | 8/2003 | Perkowski |
| 2003/0163340 A1 | 8/2003 | Fitzpatrick et al. |
| 2003/0167213 A1 | 9/2003 | Jammes et al. |
| 2003/0167222 A1 | 9/2003 | Mehrotra et al. |
| 2003/0187745 A1 | 10/2003 | Hobday et al. |
| 2003/0200156 A1 | 10/2003 | Roseman et al. |
| 2003/0204449 A1 | 10/2003 | Kotas et al. |
| 2003/0217002 A1 | 11/2003 | Enborg |
| 2004/0006509 A1 | 1/2004 | Mannik et al. |
| 2004/0015416 A1 | 1/2004 | Foster et al. |
| 2004/0029567 A1 | 2/2004 | Timmins et al. |
| 2004/0044563 A1 | 3/2004 | Stein |
| 2004/0055017 A1 | 3/2004 | Delpuch et al. |
| 2004/0073476 A1 | 4/2004 | Donahue et al. |
| 2004/0078388 A1 | 4/2004 | Melman |
| 2004/0107136 A1 | 6/2004 | Nemirofsky et al. |
| 2004/0117242 A1 | 6/2004 | Conrad et al. |
| 2004/0122083 A1 | 6/2004 | Lippert et al. |
| 2004/0122681 A1 | 6/2004 | Ruvolo et al. |
| 2004/0122735 A1 | 6/2004 | Meshkin |
| 2004/0122855 A1 | 6/2004 | Ruvolo et al. |
| 2004/0128183 A1 | 7/2004 | Challey et al. |
| 2004/0128320 A1 | 7/2004 | Grove et al. |
| 2004/0172323 A1 | 9/2004 | Stamm |
| 2004/0172379 A1 | 9/2004 | Mott et al. |
| 2004/0174979 A1 | 9/2004 | Hutton et al. |
| 2004/0186766 A1 | 9/2004 | Fellenstein et al. |
| 2004/0199496 A1 | 10/2004 | Liu et al. |
| 2004/0204991 A1 | 10/2004 | Monahan et al. |
| 2004/0240642 A1 | 12/2004 | Crandell et al. |
| 2004/0249727 A1 | 12/2004 | Cook, Jr. et al. |
| 2004/0267717 A1 | 12/2004 | Slackman |
| 2005/0010925 A1 | 1/2005 | Khawand et al. |
| 2005/0021666 A1 | 1/2005 | Dinnage et al. |
| 2005/0038733 A1 | 2/2005 | Foster et al. |
| 2005/0044254 A1 | 2/2005 | Smith |
| 2005/0055306 A1 | 3/2005 | Miller et al. |
| 2005/0060664 A1 | 3/2005 | Rogers |
| 2005/0097204 A1 | 5/2005 | Horowitz et al. |
| 2005/0114229 A1* | 5/2005 | Ackley et al. ............... 705/26 |
| 2005/0120311 A1 | 6/2005 | Thrall |
| 2005/0131837 A1 | 6/2005 | Sanctis et al. |
| 2005/0144064 A1 | 6/2005 | Calabria et al. |
| 2005/0193333 A1 | 9/2005 | Ebert |
| 2005/0197846 A1 | 9/2005 | Pezaris et al. |
| 2005/0197950 A1 | 9/2005 | Moya et al. |
| 2005/0198031 A1 | 9/2005 | Pezaris et al. |
| 2005/0202390 A1 | 9/2005 | Allen et al. |
| 2005/0203888 A1 | 9/2005 | Woosley et al. |
| 2005/0216300 A1 | 9/2005 | Appelman et al. |
| 2005/0262067 A1 | 11/2005 | Lee et al. |
| 2005/0273378 A1 | 12/2005 | MacDonald-Korth et al. |
| 2006/0009994 A1 | 1/2006 | Hogg et al. |
| 2006/0010105 A1 | 1/2006 | Sarukkai et al. |
| 2006/0031240 A1 | 2/2006 | Eyal et al. |
| 2006/0041638 A1 | 2/2006 | Whittaker et al. |
| 2006/0058048 A1 | 3/2006 | Kapoor et al. |
| 2006/0069623 A1 | 3/2006 | MacDonald Korth et al. |
| 2006/0085251 A1 | 4/2006 | Greene |
| 2006/0173817 A1 | 8/2006 | Chowdhury et al. |
| 2006/0206479 A1 | 9/2006 | Mason |
| 2006/0259360 A1 | 11/2006 | Flinn et al. |
| 2006/0271671 A1 | 11/2006 | Hansen |
| 2007/0005424 A1 | 1/2007 | Arauz |
| 2007/0027760 A1 | 2/2007 | Collins et al. |
| 2007/0073641 A1 | 3/2007 | Perry et al. |
| 2007/0077025 A1 | 4/2007 | Mino |
| 2007/0078726 A1 | 4/2007 | MacDonald Korth et al. |
| 2007/0083437 A1* | 4/2007 | Hamor ............... 705/26 |

(56) References Cited

U.S. PATENT DOCUMENTS

| | | | |
|---|---|---|---|
| 2007/0100803 A1 | 5/2007 | Cava | |
| 2007/0160345 A1 | 7/2007 | Sakai et al. | |
| 2007/0162379 A1 | 7/2007 | Skinner | |
| 2007/0192168 A1 | 8/2007 | Van Luchene | |
| 2007/0192181 A1 | 8/2007 | Asdourian | |
| 2007/0206606 A1 | 9/2007 | Coleman et al. | |
| 2007/0214048 A1 | 9/2007 | Chan et al. | |
| 2007/0226679 A1 | 9/2007 | Jayamohan et al. | |
| 2007/0233565 A1 | 10/2007 | Herzog et al. | |
| 2007/0239534 A1 | 10/2007 | Liu et al. | |
| 2007/0245013 A1 | 10/2007 | Saraswathy et al. | |
| 2007/0260520 A1 | 11/2007 | Jha et al. | |
| 2007/0282666 A1 | 12/2007 | Afeyan et al. | |
| 2007/0299743 A1 | 12/2007 | Staib et al. | |
| 2008/0052152 A1 | 2/2008 | Yufik | |
| 2008/0082394 A1 | 4/2008 | Floyd et al. | |
| 2008/0126205 A1* | 5/2008 | Evans et al. | 705/14 |
| 2008/0126476 A1* | 5/2008 | Nicholas et al. | 709/203 |
| 2008/0133305 A1* | 6/2008 | Yates et al. | 705/8 |
| 2008/0140765 A1 | 6/2008 | Kelaita et al. | |
| 2008/0162574 A1 | 7/2008 | Gilbert | |
| 2008/0201218 A1* | 8/2008 | Broder et al. | 705/14 |
| 2008/0215456 A1* | 9/2008 | West et al. | 705/27 |
| 2008/0288338 A1* | 11/2008 | Wiseman et al. | 705/14 |
| 2008/0294536 A1 | 11/2008 | Taylor et al. | |
| 2008/0300909 A1 | 12/2008 | Rikhtverchik et al. | |
| 2008/0301009 A1 | 12/2008 | Plaster et al. | |
| 2009/0006190 A1 | 1/2009 | Lucash et al. | |
| 2009/0030755 A1* | 1/2009 | Altberg et al. | 705/7 |
| 2009/0030775 A1 | 1/2009 | Vieri | |
| 2009/0106080 A1 | 4/2009 | Carrier et al. | |
| 2009/0106127 A1* | 4/2009 | Purdy et al. | 705/27 |
| 2009/0119167 A1 | 5/2009 | Kendall et al. | |
| 2009/0164323 A1 | 6/2009 | Byrne | |
| 2009/0182589 A1 | 7/2009 | Kendall et al. | |
| 2009/0204848 A1 | 8/2009 | Kube et al. | |
| 2009/0222348 A1 | 9/2009 | Ransom et al. | |
| 2009/0240582 A1* | 9/2009 | Sheldon-Neal et al. | 705/14 |
| 2009/0276284 A1 | 11/2009 | Yost | |
| 2009/0293019 A1 | 11/2009 | Raffel et al. | |
| 2010/0042684 A1 | 2/2010 | Broms et al. | |
| 2010/0076816 A1 | 3/2010 | Phillips | |
| 2010/0076851 A1 | 3/2010 | Jewell, Jr. | |
| 2010/0094673 A1 | 4/2010 | Lobo et al. | |
| 2010/0228617 A1 | 9/2010 | Ransom et al. | |
| 2011/0060621 A1 | 3/2011 | Weller et al. | |
| 2011/0103699 A1 | 5/2011 | Ke et al. | |
| 2011/0153383 A1 | 6/2011 | Bhattacharjya et al. | |
| 2011/0196802 A1 | 8/2011 | Ellis et al. | |
| 2011/0225050 A1 | 9/2011 | Varghese | |
| 2011/0231226 A1 | 9/2011 | Golden | |
| 2011/0231383 A1 | 9/2011 | Smyth et al. | |
| 2011/0271204 A1 | 11/2011 | Jones et al. | |
| 2011/0276513 A1 | 11/2011 | Erhart et al. | |
| 2012/0005187 A1 | 1/2012 | Chavanne | |
| 2012/0030067 A1 | 2/2012 | Pothukuchi et al. | |
| 2012/0084135 A1 | 4/2012 | Nissan et al. | |
| 2012/0158715 A1 | 6/2012 | Maghoul et al. | |
| 2012/0166299 A1 | 6/2012 | Heinstein et al. | |
| 2012/0231424 A1 | 9/2012 | Calman et al. | |
| 2013/0073392 A1 | 3/2013 | Allen et al. | |
| 2013/0080200 A1 | 3/2013 | Connolly et al. | |
| 2013/0080426 A1 | 3/2013 | Chen et al. | |
| 2013/0085893 A1 | 4/2013 | Bhardwaj et al. | |
| 2013/0144870 A1 | 6/2013 | Gupta et al. | |
| 2014/0032544 A1 | 1/2014 | Mathieu et al. | |
| 2014/0114680 A1 | 4/2014 | Mills et al. | |
| 2014/0289005 A1 | 9/2014 | Laing et al. | |

FOREIGN PATENT DOCUMENTS

| | | |
|---|---|---|
| EP | 0636993 | 4/1999 |
| EP | 0807891 | 5/2000 |
| EP | 1241603 | 3/2001 |
| GB | 2397400 | 7/2004 |
| GB | 2424098 | 9/2006 |
| JP | 2001283083 | 10/2001 |
| WO | 97/17663 | 5/1997 |
| WO | 98/32289 | 7/1998 |
| WO | 98/47082 | 10/1998 |
| WO | WO9849641 | 11/1998 |
| WO | 99/59283 | 11/1999 |
| WO | 00/25218 | 5/2000 |
| WO | 01/09803 | 2/2001 |
| WO | 01/82135 | 11/2001 |
| WO | 01/97099 | 12/2001 |
| WO | 02/037234 | 11/2002 |
| WO | 03/094080 | 11/2003 |
| WO | 2012/093410 | 7/2012 |

OTHER PUBLICATIONS

Alt et al., "Bibliography on Electronic Commerce," Electronic Markets—The International Journal, Oct. 1993, 5 pages, vol. 3, No. 3.

Alt et al., "Computer Integrated Logistics," Electronic Markets—The International Journal, Oct. 1993, 1 page, vol. 3, No. 3.

auctionwatch.com, multiple pages—including search results for "expedition," printed Apr. 21, 2001.

auctiva.com, multiple pages, undated but website copyright date is "1999-2000."

Braganza, "IS Research at Cranfield—A Look at the Future," Electronic Markets—The International Journal, Oct. 1993, 1 page, vol. 3, No. 3.

Brecht et al., "The IM 2000 Research Programme," Electronic Markets—The International Journal, Oct. 1993, 1 page, vol. 3, No. 3.

Business Wire business editors/high-tech writers, "2Roam Partners With Pumatech to Delivery Wireless Alerts," Business Wire, Dec. 18, 2000.

Business Wire business editors/high-tech writers, "2Roam Takes eHow's How-to Solutions Wireless: With 2Roam, the Web's One-Stop Source for Getting Things Done is on More Wireless Devices, with Ability to Purchase its Products from Anywhere," Business Wire, Oct. 2, 2000.

Business Wire business editors/high-tech writers, "2Roam Drives Hertz to the Wireless Web; Number One Car Rental Company to Provide Customers Wireless Access From Any Device," Business Wire, Aug. 7, 2001.

buy.com, www.buy.com homepage, printed Oct. 13, 2004.

Clarke, "Research Programme in Supra-organizational Systems," Electronic Markets—The International Journal, Oct. 1993, 2 pages, vol. 3, No. 3.

Clemons et al., "Evaluating the prospects for alternative electronic securities markets," Proceedings of the twelfth international conference on information systems, New York, New York, United States, pp. 53-64, 1991.

friendster.com, homepage and "more info" pages, printed Apr. 29, 2004.

Google News archive search for "2Roam marketing" performed over the date range 2000-2003.

Google News archive search for "2Roam SMS" performed over the date range 2000-2008.

Grabowski et al., "Mobile-enabled grid middleware and/or grid gateways," GridLab—A Grid Application Toolkit and Testbed, Work Package 12—Access for Mobile Users, Jun. 3, 2003.

Graham, "The Emergence of Linked Fish Markets in Europe," Electronic Markets—The International Journal, Jul. 1998, 4 pages, vol. 8, No. 2.

Gunthorpe et al., "Portfolio Composition and the Investment Horizon," Financial Analysts Journal, Jan.-Feb. 1994, pp. 51-56.

Halperin, "Toward a Process Handbook for Organizational Coordination Processes," Electronic Markets—The International Journal, Oct. 1993, 1 page, vol. 3, No. 3.

Hess et al., "Computerized Loan Origination Systems: An Industry Case Study of the Electronic Markets Hypothesis," MIS Quarterly, Sep. 1994, pp. 251-275.

(56) References Cited

OTHER PUBLICATIONS

IBM, "Anonymous Delivery of Goods in Electronic Commerce," IBM Technical Disclosure Bulletin, Mar. 1996, pp. 363-366, vol. 39, No. 3.
IBM, "Personal Optimized Decision/Transaction Program," IBM Technical Disclosure Bulletin, Jan. 1995, pp. 83-84, vol. 38, No. 1.
IEEE 100—The Authoritative Dictionary of IEEE Standards Terms, Seventh Edition, 2000. Entire book cited; table of contents, source list, and terms beginning with A included. ISBN 0-7381-2601-2.
Ives et al., "Editor's Comments—MISQ Central: Creating a New Intellectual Infrastructure," MIS Quarterly, Sep. 1994, p. xxxv.
Klein, "Information Logistics," Electronic Markets—The International Journal, Oct. 1993, pp. 11-12, vol. 3, No. 3.
Klein, "Introduction to Electronic Auctions," Electronic Markets—The International Journal, Dec. 1997, 4 pages, vol. 7, No. 4.
Kubicek, "The Organization Gap," Electronic Markets—The International Journal, Oct. 1993, 1 page, vol. 3, No. 3.
Kuula, "Telematic Services in Finland," Electronic Markets—The International Journal, Oct. 1993, 1 page, vol. 3, No. 3.
Lalonde, "The EDI World Institute: An International Approach," Electronic Markets—The International Journal, Oct. 1993, 1 page, vol. 3, No. 3.
Lee et al., "Intelligent Electronic Trading for Commodity Exchanges," Electronic Markets—The International Journal, Oct. 1993, 2 pages, vol. 3, No. 3.
Lee et al., "Electronic Brokerage and Electronic Auction: The Impact of IT on Market Structures," Proceedings of the 29th Annual Hawaii International COnference on System Sciences, 1996, pp. 397-406.
Lee, "AUCNET: Electronic Intermediary for Used-Car Transactions," Electronic Markets—The International Journal, Dec. 1997, pp. 24-28, vol. 7, No. 4.
LIVE365 press release, "Live365 to Offer Opt-In Advertising on Its Website," Oct. 15, 2004.
London Business School, "Overture and Google: Internet Pay-Per-Click (PPC) Advertising Options," Mar. 2003.
M2 Presswire, "Palm, Inc.: Palm unveils new web browser optimised for handhelds; HTML browser offers high-speed web-browsing option," Mar. 13, 2002.
Malone et al., "Electronic Markets and Electronic Hierarchies," Communications of the ACM, Jun. 1987, pp. 484-497, vol. 30, No. 6.
Mansell et al., "Electronic Trading Networks: The Route to Competitive Advantage?" Electronic Markets—The International Journal, Oct. 1993, 1 page, vol. 3, No. 3.
Mardesich, "Onsale takes auction gavel electronic," Computer Reseller News, Jul. 8, 1996, pp. 2, 32.
Marteau, "Shop with One Click, Anywhere, Anytime," Information Management and Consulting, 2000, pp. 44-46, vol. 15, No. 4.
Massimb et al., "Electronic Trading, Market Structure and Liquidity," Financial Analysts Journal, Jan.-Feb. 1994, pp. 39-49.
McGinity, "Build Your Weapon," PC Magazine, Apr. 24, 2011, printed from www.pcmag.com/print_article2/0,1217,a%253D3955,00.asp.
Meade, "Visual 360: a performance appraisal system that's 'fun,'" HRMagazine, 44, 7, 118(3), Jul. 1999.
"Mediappraise: Mediappraise Receives National Award for Web-based Technology That Enables Companies to Solve Thorny HR Problem," Dec. 14, 1998.
Medvinsky et al., "Electronic Currency for the Internet," Electronic Markets—The International Journal, Oct. 1993, 2 pages, vol. 3, No. 3.
metails.com, www.metails.com homepage, printed Oct. 13, 2004.
Microsoft Computer Dictionary, Fifth Edition, front matter and p. 33.
Microsoft Computer Dictionary, Fifth Edition, front matter, back matter, and pp. 479, 486.
Neches, "FAST—A Research Project in Electronic Commerce," Electronic Markets—The International Journal, Oct. 1993, 4 pages, vol. 3, No. 3.
Neo, "The implementation of an electronic market for pig trading in Singapore," Journal of Strategic Information Systems, Dec. 1992, pp. 278-288, vol. 1, No. 5.
O'Mahony, "An X.500-based Product Catalogue," Electronic Markets—The International Journal, Oct. 1993, 2 pages, vol. 3, No. 3.
"Onsale: Onsale Brings Thrill of Auctions and Bargain Hunting Online; Unique Internet retail service debuts with week-long charity auction for The Computer Museum in Boston," May 24, 1995, printed from www.dialogweb.com/cgi/dwclient?dwcommand=DWEBPRINT%20810-489267.
"Onsale joins fry as online shopping picks up speed: Internet Booms," Computer Reseller News, Jun. 5, 1995, p. 73.
Palm, Inc., Palm™ Web Pro Handbook, copyright 2002-2003.
Post et al., "Application of Auctions as a Pricing Mechanism for the Interchange of Electric Power," IEEE Transactions on Power Systems, Aug. 1995, pp. 1580-1584, vol. 10, No. 3.
Preist et al., "Adaptive agents in a persistent shout double auction," International Conference on Information and Computation, Proceedings of the first international conference on Information and computation economies, Oct. 25-28, 1998, Charleston, United States, pp. 11-18.
Qualcomm, "Brew Developer Support," printed from web.archive.org/web/20020209194207/http://www.qualcomm.com/brew/developer/support/kb/52.html on Aug. 30, 2007.
RCR Wireless News, "Lockheed Martin to use 2Roam's technology for wireless platform," RCR Wireless News, Sep. 10, 2001.
Reck, "Formally Specifying an Automated Trade Execution System," J. Systems Software, 1993, pp. 245-252. vol. 21.
Reck, "Trading-Process Characteristics of Electronic Auctions," Electronic Markets—The International Journal, Dec. 1997, pp. 17-23, vol. 7, No. 4.
repcheck.com, www.repcheck.com homepage, printed from web.archive.org/web/20020330183132/http://repcheck.com on Sep. 5, 2009.
Resnick et al., "Reputation Systems," Communications of the ACM, Dec. 2000, pp. 45-48, vol. 43, No. 12.
Rockoff et al., "Design of an Internet-based system for remote Dutch auctions," Internet Research: Electronic Networking Applications and Policy, 1995, pp. 10-16, vol. 5, No. 4.
Rysavy, "Mobile-commerce ASPs do the legwork," Network Computing, Jan. 22, 2001, p. 71, 6 pgs., vol. 12, No. 2.
Saunders, "AdFlight to Offer WAP Ads," Oct. 17, 2000, printed from clickz.com/487531/print.
Schmid, "Electronic Markets," Electronic Markets—The International Journal, Oct. 1993, 2 pages, vol. 3, No. 3.
Schwankert, "Matsushita Taps 2Roam for Wireless Solutions," www.internetnews.com/bus-news.article.php/674811, Feb. 2, 2001.
Siegmann, "Nowhere to go but up," PC Week, Oct. 23, 1995, 3 pages, vol. 12, No. 42.
Telephony Staff, "Air-ASP," Telephony Online, Oct. 2, 2000, 3 pages.
Teo, "Organizational Factors of Success in Using EDIS: A Survey of Tradenet Participants," Electronic Markets—The International Journal, Oct. 1993, 2 pages, vol. 3, No. 3.
Tjostheim et al., "A case stud of an on-line auction for the World Wide Web," printed from www.nr.no/gem/elcom/publikasjoner/enter98e.html on Jun. 10, 1999, 10 pages.
Turban, "Auctions and Bidding on the Internet: An Assessment," Electronic Markets—The International Journal, Dec. 1997, 5 pages, vol. 7, No. 4.
ubid.com, "How do I Update my Address, Phone, Credit Card, Password, etc.?" printed from web.archive.org/web/20010208113903/www.ubid.com/help/topic13.asp on Aug. 30, 2007.
ubid.com, "How do I track my shipment?" printed from web.archive.org/web/20010331032659/www.ubid.com/help/topic27.asp on Aug. 30, 2007.
ubid.com, "Can I track all my bids from My Page?" printed form web.archive.org/web/20010208114049/www.ubid.com/help/topic14.asp on Aug. 30, 2007.
Van Heck et al., "Experiences with Electronic Auctions in the Dutch Flower Industry," Electronic Markets—The International Journal, Dec. 1997, 6 pages, vol. 7, No. 4.

(56) References Cited

OTHER PUBLICATIONS

Verizon Wireless, "Verizon Wireless Customers Get It NowSM; Get Games, Get Pix, Get Ring Tones and Get Going in Full Color," press release to PRNEWSWIRE, Sep. 23, 2002.
Warbelow et al., "AUCNET: TV Auction Network System," Harvard Business School 9-190-001, Jul. 19, 1989, rev. Apr. 12, 1996, pp. 1-15.
Weber, "How Financial Markets are Going On-line," Electronic Markets—The International Journal, Oct. 1993, 2 pages, vol. 3, No. 3.
Wireless Internet, "DailyShopper Selects 2Roam to Enable Mobile Customers to Retrieve Nearby Sales and Promotions Information," Wireless Internet, Apr. 2001.
Wireless Week, "Verizon Wireless Gets Going on BREW Agenda," Wireless Week, Sep. 23, 2002.
xchanger.net, webpage printed from www.auctiva.com/showcase/as_4sale.asp?uid=xchanger, undated but at least as early as Oct. 12, 2000.
Yu et al., "Distributed Reputation Management for Electronic Commerce," Computational Intelligence, 2002, pp. 535-549, vol. 18, No. 4.
Zetmeir, Auction Incentive Marketing, print of all pages of website found at home.earthlink.net/~bidpointz/ made Oct. 8, 2004.
Zimmermann, "Integration of Financial Services: The TeleCounter," Electronic Markets—The International Journal, Oct. 1993, 1 page, vol. 3, No. 3.
Zwass, "Electronic Commerce: Structures and Issues," International Journal of Electronic Commerce, Fall 1996, pp. 3-23, vol. 1, No. 1.
Anonymous, Image manipulation (image-editing software and image-manipulation systems)(Seybold Special Report, Part II), Seybold Report on Publishing Systems, May 15, 1995, p. S35(9), vol. 24, No. 18.
Ball et al., "Supply chain infrastructures: system integration and information sharing," ACM SIGMOD Record, 2002, vol. 31, No. 1, pp. 61-66.
Berger et al., "Random Ultiple-Access Communication and Group Testing," IEEE, 1984.
Business Wire business/technology editors, "Sellers Flock to OutletZoo.com as New Automatic Price Drop Method Moves Excess Inventory Online," Business Wire, Oct. 25, 1999.
Business Wire business editors/high-tech writers, "PictureWorks Technology, Inc. Expands in Real Estate Market with Adoption of Rimfire on REALTOR.com," Business Wire, Nov. 8, 1999.
Business Wire business editors/high-tech writers, "PictureWorks Technology, Inc. Shows Strong Revenue Growth in Internet Imaging Business," Business Wire, Nov. 10, 1999.
Chen et al., "Detecting Web Page Structure for Adaptive Viewing on Small Form Factor Devices," ACM, May 20-24, 2003.
ICrossing, "ICrossing Search Synergy: Natural & Paid Search Symbiosis," Mar. 2007.
Joshi, "Information visibility and its effect on supply chain dynamics," Ph.D. dissertation, Massachusetts Institute of Technology, 2000 (fig. 4.5; p. 45).
Rose, "Vendors strive to undo Adobe lock-hold," Computer Reseller News, Feb. 5, 1996, n 66669, p. 71(7).
Sen, "Inventory and Pricing Models for Perishable Products," Doctor of Philosophy Dissertation—University of Southern California, Aug. 2000.

\* cited by examiner

POINT-AND-SHOOT PRODUCT LISTER

CROSS-REFERENCE TO RELATED APPLICATIONS

Not Applicable.

STATEMENT REGARDING FEDERALLY SPONSORED RESEARCH OR DEVELOPMENT

Not Applicable.

BACKGROUND OF THE INVENTION

1. The Field of the Invention

The present invention relates generally to data communication, and more particularly, but not necessarily entirely, to over-the-air or through-the-air communication of listing content generated using a wireless mobile device.

2. Description of Related Art

E-commerce, that is, commercial transactions consummated through electronic communication (e.g., via the World Wide Web (WWW)), is a rapidly expanding segment of the global economy. One type of e-commerce allows sellers to offer items for sale to potential buyers using websites operated by third-parties. These third-party websites may include auction-type websites and classified-type websites. The operators of these websites typically charge the seller a fee for posting listings on their websites. In a typical e-commerce transaction involving one of these types of websites, a buyer, accessing the website from a remote computer, searches listings on the websites and decides on an item that he or she is interested in purchasing. When a desired item is found in a listing, the buyer may then purchase the desired item from the seller pursuant to the seller's terms indicated in the listing.

Prior to creating a listing for posting an e-commerce website, a seller may be first required to establish a seller's account with the desired e-commerce website through a one-time registration process. This registration process may require that the seller provide information to verify the seller's identity and contact information. Once the seller's identity has been confirmed, the registration process may then require that the seller select the method by which the seller intends to pay any fees charged by the e-commerce website and the methods by which buyers may pay for items purchased from the seller.

Once a seller has completed the registration process, the e-commerce website may allow the seller to create listings through an online and interactive listing process displayed on a web browser of the seller's own computer. The online and interactive listing process may facilitate the creation of a listing by guiding the seller step-by-step through the listing creation process. That is, the interactive process may allow a seller to create a listing by providing the necessary discrete data components that form listing content step-by-step until a completed listing has been formed and posted.

For example, to create a listing the seller may first be required to login to his or her seller's account with the e-commerce website from the seller's computer. After a seller has successfully logged in, the e-commerce website may provide a seller with an interface displayed in the seller's web browser that allows the seller to select the option to create a new listing under the seller's account using the online and interactive process.

Once initiated, the online and interactive process may first prompt the seller to select a product category for the new listing. This may be accomplished by allowing the seller to select a product category by searching, browsing or using a previous product category selection. The association of a product category with the listing will allow buyers to more easily locate the listing. Once a product category has been selected for the listing, the online and interactive process may then prompt the seller to enter descriptive information, such as a listing title and a detailed description of the product. The online and interactive process may also prompt the seller to enter the appropriate pricing information based on the selling format, such as sales price, reserve price, etc., as well as a duration of the listing. The online and interactive process may also require that the seller choose a method of accepted payment as well has provide shipping information. The seller may also be prompted to provide return policy information.

Once a seller has entered all the necessary textual information for a listing, the online and interactive process may then prompt the seller to upload any images related to the product in the listing using a file uploader service hosted by the e-commerce website. The file uploader service allows the seller to add or upload digital images for display with the new listing. To initiate the file uploader service, the seller typically clicks on an "Add Pictures" button. The file uploader service will then prompt the seller to browse the file directory of his or her own computer and select the images desired to be included in the listing. Of course, it is incumbent upon the seller to have previously uploaded the images from a digital camera.

Once the appropriate file directory is located, the seller may then manually select one or more images from the file directory for uploading. When the images have been selected and finalized, the file uploader service may upload the images to the e-commerce website from the memory of the seller's computer. When the seller has entered and uploaded all of the desired discrete data components that from listing content for a single listing, the online and interactive process may provide the seller with the option to preview a listing with the listing content. This preview option will allow the seller to edit the listing content if any changes are desired prior to making it available on a network.

Once deemed acceptable by the seller, the online and interactive process will prompt the seller to actually post the listing content "live" such that it is accessible to buyers via the e-commerce website. After new listing content has been posted, the online and interactive process may prompt the seller to create another listing through the interactive process, if desired. When finished, a seller may terminate the online and interactive process for creating listings by logging out of the seller's account with the e-commerce website.

While the above process is beneficial to some sellers in some situations, the online and interactive process described above for creating listings may actually discourage some sellers from posting listings on e-commerce websites in some situations. In particular, the online and interactive process currently being utilized by e-commerce websites to create listings is overly time consuming and inefficient, especially when multiple listings need to be created and posted. The foremost drawbacks to the currently available online and interactive processes for creating listings appears to be the piecemeal manner in which the listings are created and the need to manually associate and upload images using a file uploader service.

Further drawbacks of the currently available online and interactive processes for creating listings include requiring sellers to manually login to e-commerce websites to post listing content. It would therefore be an improvement over the currently available online and interactive processes for creating listings to provide a more efficient method, system, and program product for sellers to easily and quickly post listing content by eliminating some of the manual steps previously required.

The prior art is thus characterized by several disadvantages that are addressed by the present invention. The present invention minimizes, and in some aspects eliminates, the above-mentioned failures and other problems by utilizing the methods and structural features described herein. The features and advantages of the invention will be set forth in the description that follows, and in part will be apparent from the description, or may be learned by the practice of the invention without undue experimentation. The features and advantages of the invention may be realized and obtained by means of the instruments and combinations particularly pointed out in the appended claims.

BRIEF DESCRIPTION OF THE DRAWINGS

The features and advantages of the disclosure will become apparent from a consideration of the subsequent detailed description presented in connection with the accompanying drawings in which.

DETAILED DESCRIPTION

Figure 1:
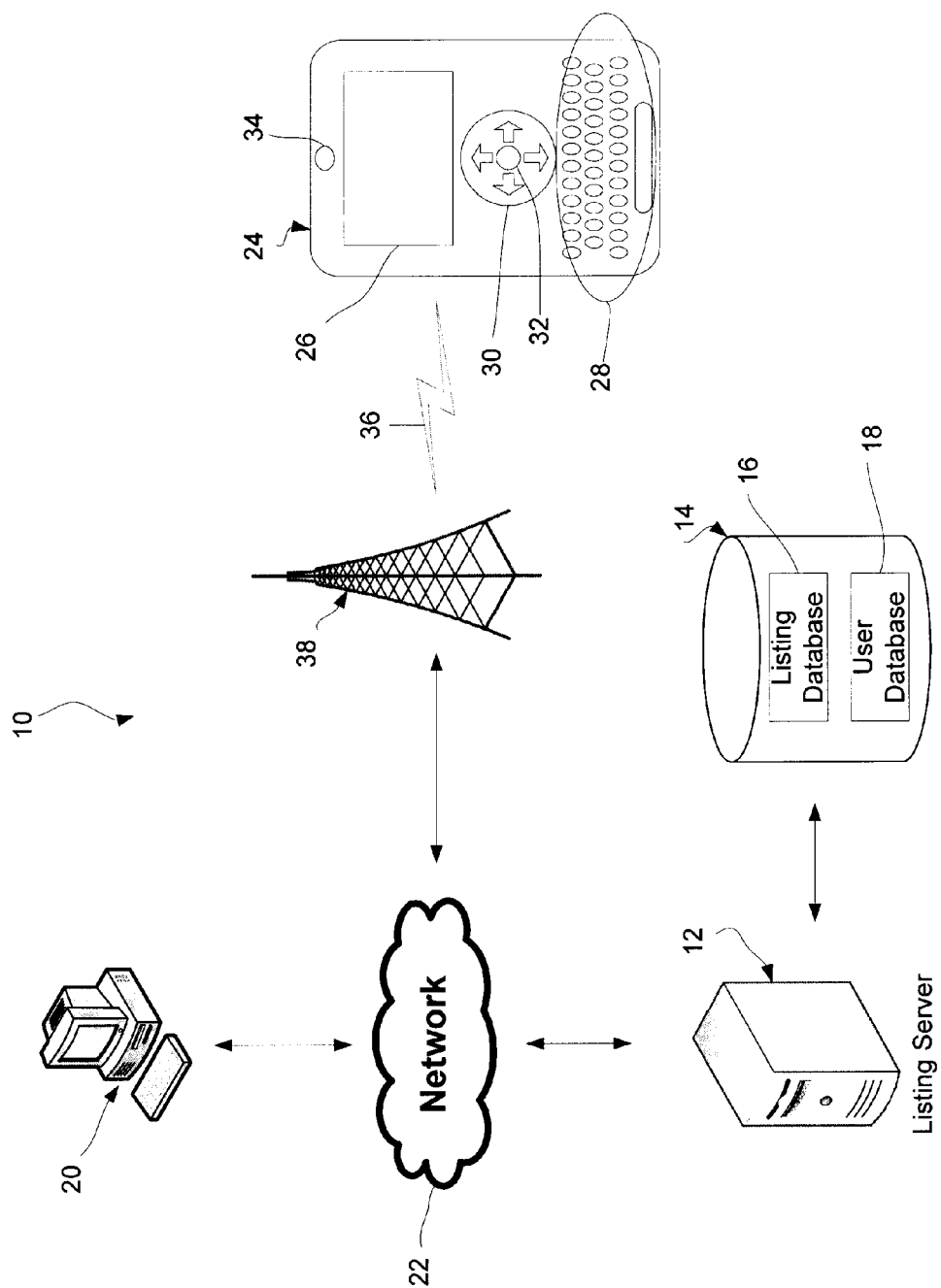
FIG. 1 is a schematic diagram of an exemplary listing environment pursuant to an embodiment of the present invention.

For the purposes of promoting an understanding of the principles in accordance with the disclosure, reference will now be made to the embodiments illustrated in the drawings and specific language will be used to describe the same. It will nevertheless be understood that no limitation of the scope of the disclosure is thereby intended. Any alterations and further modifications of the inventive features illustrated herein, and any additional applications of the principles of the disclosure as illustrated herein, which would normally occur to one skilled in the relevant art and having possession of this disclosure, are to be considered within the scope of the disclosure claimed.

It must be noted that, as used in this specification and the appended claims, the singular forms "a," "an," and "the" include plural referents unless the context clearly dictates otherwise. In describing and claiming the present disclosure, the following terminology will be used in accordance with the definitions set out below.

As used herein, the terms "comprising," "including," "containing," "having," "characterized by," and grammatical equivalents thereof are inclusive or open-ended terms that do not exclude additional, unrecited elements or method steps.

As used herein, the term "listing" may refer to an association of one or more discrete data components, such as image data and text data, that are displayed together on a computing device. A listing may include, without limitation, a sales listing, a blog listing, and a social network listing. Listings may be dynamically provided by a server in web pages in response to requests received over a network.

As used herein, the term "listing content" may refer to a collection of one or more discrete data components that are utilized to provide the necessary content for listings posted at a computer server. Listing content may be stored in a database and may include text data, image data, audio data, and video data. A computer server may dynamically generate listings on web pages from the listing content stored in a database. Listing content may be provided to a computer server in a communication from a wireless mobile device as described herein.

As used herein, the term "proposed listing content" may refer to any information that is automatically generated in response to user input, or captured listing content, and that is utilized to form listings similar to listing content. Proposed listing content is typically not included in an actual listing until reviewed and approved by a user, since it is automatically generated. Proposed listing content may include, among other things, stock information about a product, including stock images, stock descriptions, proposed titles, proposed taxonomy or product classification, and comparative pricing data.

As used herein, the term "capture" may refer to the process of collecting, formatting and storing data relating to real-world objects or interactions in a computer memory. The data for the real-world objects may be obtained using sensors able to detect light reflected off of objects, audio waves, and physical interactions with a user, e.g., user interactions with a keypad, buttons, touch screen, etc.

Turning now to the present disclosure, FIG. 1 illustrates an exemplary embodiment of a listing environment 10 in accordance with an embodiment of the present disclosure. As shown, the listing environment 10 includes a listing server 12. The listing server 12 may be one of a variety of different types of servers that provide information and services on the Internet. For example, the listing server 12 may generate listings from listing content in response to requests. In an embodiment of the present disclosure, the listing server 12 may comprise an e-commerce server that allows users to post listings regarding items and services for sale, including, but not limited to, classified-type listings and auction-type listings. In an embodiment of the present disclosure, the listing server 12 may comprise a social networking server that allows users to create online personal spaces that allow users to post listings that are viewable by others. In an embodiment of the present disclosure, the listing server 12 may comprise a blogging server. In an embodiment of the present disclosure, the listing server 12 may include any type of server the allows users to post listing content such that it is available to others on a network, such as the Internet. For example, the listing server 12 may comprise a server operated by a law enforcement agency that allows officers investigating a crime scene to post listing content from the field. Third-party access to the listing content hosted by the listing server 12 may be restricted or unrestricted.

The listing server 12 may include an associated data storage 14. The data storage 14 includes a listing database for storing listing content. In an embodiment of the present disclosure, the listing content may include discrete data components, such as textual and graphical information (e.g., digital images). The data storage 14 further includes a user database 18 containing account information for each user authorized to post listings in the listing database 16. The user database 18 may also include account information for each user authorized to view listing content in the listing database 16. In an embodiment of the present disclosure, the listing content stored in the listing database 16 may be searchable.

In an embodiment of the present disclosure, the listing content stored in the listing database 16 may include associated taxonomy or categorical information that allows the listing content to be grouped together in a hierarchical manner when included in listings. In an embodiment of the present disclosure, the listing content stored in the listing database 16 may be part of an ongoing message based upon an electronic conversation on a single subject, commonly referred to as a "thread" or a "blog." In an embodiment of the present disclosure, the listing content stored in the listing database 16 may be part of a user's private space or page on a social networking site.

The listing server 12 may provide the listing content stored in the listing database 16 to users of remote computers 20 via a network 22. It will be appreciated that, while only one remote computer 20 is depicted, a plurality of remote computers 20 may have access to the listing content. In an embodiment of the present disclosure, the listing server 12 may host a website, such as an e-commerce website, a blogging website, or a social networking site. The remote computer 20 may request particular web pages of the website, which are then displayed in a web browser running on the remote computer 20. The web pages may include one or more listings generated from the listing content that is stored in the listing database 16. The user of the remote computer 20 may be able to navigate through the listing content in a wide variety of manners such that the user may be provided with only a desired subset of the listings. For example, the user may conduct keyword searches of the listing content or the user may use taxonomy or categorical information to find desired listing content. Where the listing content stored in the listing database 16 is part of a social networking site, a user may access the listing content by entering the private spaces or pages of the members of the social networking site.

The network 22 may include both wired and wireless communication paths. In an embodiment of the present disclosure, the network 22 may comprise a local area network (LAN). In an embodiment of the present disclosure, the network 22 may comprise a wide area network (WAN). In an embodiment of the present disclosure, the network 22 may comprise a worldwide network of computers that use the TCP/IP network protocols to facilitate data transmission, such as the Internet.

The user database 18 may include account information for both users that post listing content and users that view listing content. The listing server 12 may provide a subscriber interface through which users may enter the required information to establish user accounts. The account information for each user may include contact information as well as payment information, such as credit card information and the like. The account information may further include a unique login identifier (ID) and a password such that each user may only access his or her account on the listing server 12. The account information may further include listing preferences for the listings posted by the users, which will be explained in more detail below. The listing server 12 may further include a listing management interface such that users can manage their listing content in the listing database 16.

The listing environment 10 further includes one or more mobile devices 24 (only one of which is illustrated) by which listing content for listings may be added to the listing database 16 by users. The mobile devices 24 within the listing environment 10 can be implemented with almost any portable communication device capable of over-the-air or through-the air radio frequency ("RF") communication, as understood by those skilled in the art, with the listing server 12. For example, a mobile device 24 can be a smart mobile device, a mobile telephone, an email communication device, a personal digital assistant (PDA), or other mobile device. Regardless of the embodiment, each of the mobile devices 24 may include a display 26 (e.g., a liquid crystal display ("LCD")) capable of displaying textual and/or graphical content. In addition, the mobile devices 24 can include a virtual or physical keypad 28 that can be utilize by the user to enter textual information. In the illustrated embodiment, the mobile devices 24 can further include a navigation device 30, such as arrow buttons, touch pad, scroll knob, key, or dial, and a selection button 32 (e.g., an "enter" key, icon, or toolbar). The navigation device 30, for example, can permit a user to navigate a cursor among textual or graphical options presented within the display 26, and pressing the selection button 32 indicates user selection of the option designated by the cursor on the display. The mobile device 24 may further include an integrated camera 34 for capturing digital images. The digital images taken by the camera 34 may be locally stored in memory at the mobile device 24.

In the illustrated embodiment of the listing environment 10, the mobile device 24 is coupled by a wireless communication link 36 to a base station system 38 as understood by those skilled in the art, which may include a cellular communication tower, an antenna, or even a satellite. The base station system 38 may provide a connection to the listing server 12 via the network 22. In this regard, the base station system 38 may comprise a gateway support node that acts as a gateway between a wireless data network and other networks, such as the Internet or private networks. The wireless communication link 36 may comprise any communication standard, including the recently developed 3G wireless standard or older communication standards. In an embodiment of the present disclosure, the mobile device 24 may be connected to a computer (not shown) or computer network (not shown) that has access to the network 22 and the connection between the mobile device 24 and the computer may be wired or wireless.

The mobile device 24 may provide the standard voice function of a mobile phone. In addition, the mobile device

24 may provide additional functions, such as short message service (SMS) text messaging, electronic mail (e-mail), packet switching for access to the Internet, gaming, Bluetooth, infrared, multimedia messaging service (MMS) for sending messages that include multimedia objects (images, audio, video, rich text), MP3 player, radio, and GPS. The mobile device 24 may be able to connect to cellular phone networks, which are in turn interconnected to the public switched telephone network (PSTN). The mobile device 24 may take the form of any portable electronic device with a camera that is used for mobile voice and data communication, including, but not limited to, commercially available I-PHONES, BLACKBERRIES, and TREOS. The mobile device 24 may take the form of cameras with WI-FI connection ability.

Figure 2:
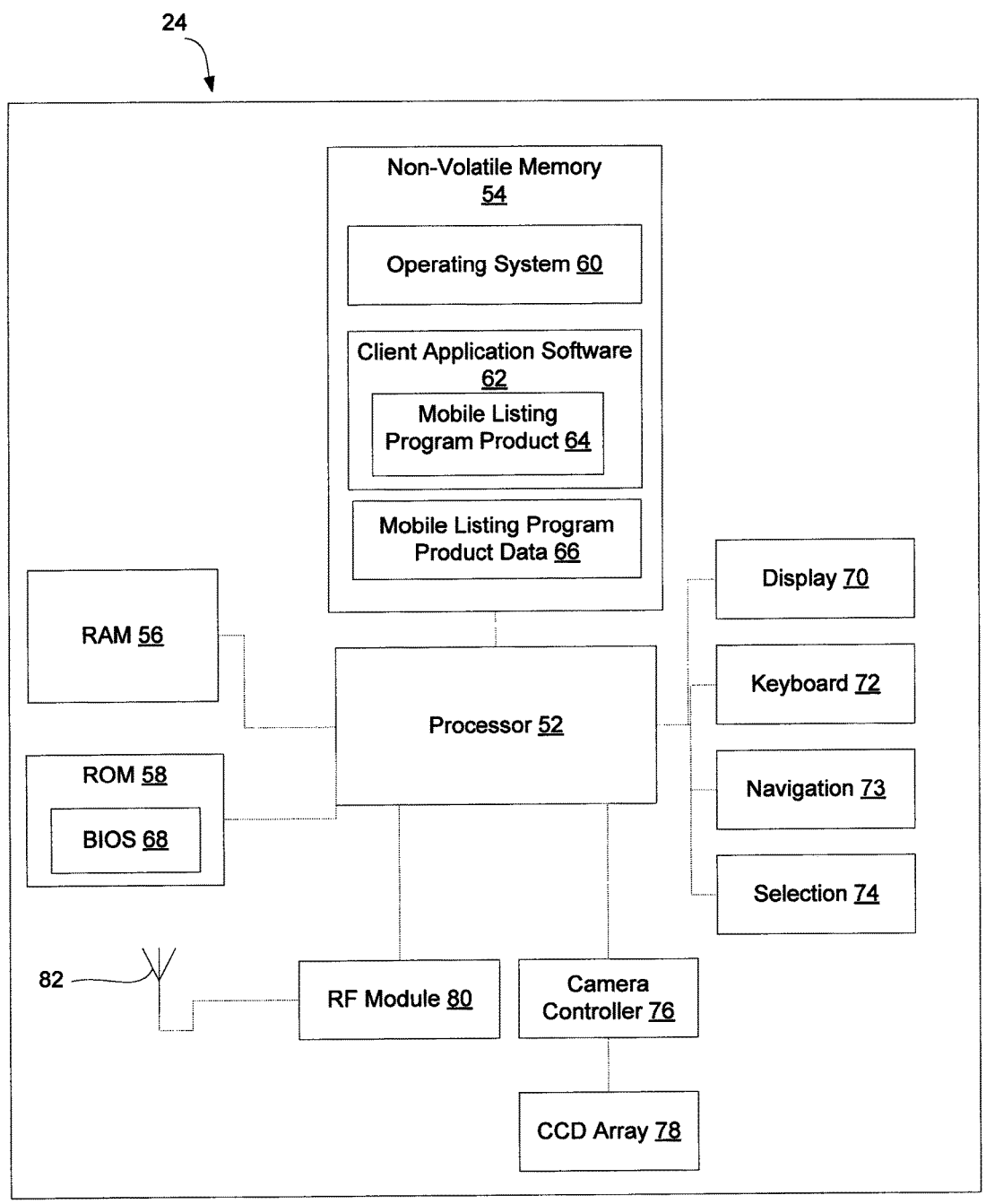
FIG. 2 is a block diagram of an exemplary architecture for a mobile device.

Referring now to FIG. 2, there is shown an exemplary architecture of the mobile device 24 pursuant to an embodiment of the present disclosure. The mobile device 24 may include a processor 52 connected to memory, namely, a non-volatile memory 54, a random-access memory (RAM) 56, and a read-only memory (ROM) 58. The non-volatile memory 54 may comprise any type of computer memory that can retain stored information even when power is removed, such as flash memory. The non-volatile memory 54 may store computer-readable instructions, i.e. software, that are executable by the processor 52. The non-volatile memory 54 may store an operating system 60 and client application software 62. The operating system 60 may comprise any operating system suitable for use with smart mobile devices, including, without limitation, Symbian OS, Linux, Windows Mobile OS, Savaje OS, Andriod, and OS X.

The client application software 62 may include a mobile listing program product 64. The non-volatile memory 54 may further store data, including mobile listing program product data 66. The RAM 56 may dynamically and temporarily store programs and data for processing by the processor 52. Prior to execution, the computer-readable instructions for the operating system 60 and the mobile listing program product 64 may be loaded from the non-volatile memory 54 into the RAM 56 as is known to one having ordinary skill in the art. The ROM 58 may include a BIOS 68 that controls the most basic operations and is responsible for a boot-up process for the processor 52 and for initializing other hardware in the mobile device 24. The BIOS 68 of the ROM 58 may be updated from time to time.

The processor 52 may be connected to a display 70, keyboard 72, navigation 73, and selection 74. The display 70 may be operable to display content to a user and may include a touchscreen that can detect the presence and location of a touch within the display area. The display 70 may include an LCD display. The keyboard 72 may allow a user to enter text and commands that are processed by the processor 52. The keyboard 72 may be virtually displayed by the display 70 or may include physical buttons on the mobile device 24. The navigation 73 may allow a user to navigate through a graphical user interface that is displayed by the display 70. The selection 74 may allow a user to select options displayed on the display 70. The mobile device 24 may further include a microphone and speaker, neither of which is shown in FIG. 2.

The processor 52 may also be connected to a camera controller 76. The camera controller 76 may provide image data representing "digital images" captured by a CCD array 78 to the processor 52. The image data may also include "video images" captured by the CCD array 78. In particular, the CCD array 78 may comprise a plurality of semiconductor light-sensitive electronic devices that each emit an electrical signal proportional to the amount of light striking it. Once captured and processed, the image data may be stored in the non-volatile memory 54 in a suitable format, such as the JPEG file format, as is known to one having ordinary skill in the art.

In an embodiment of the present disclosure, the mobile device 24 may include a microphone for capturing listing content in the form of audio data. For example, a user may decide to describe an image with an audio recording. The audio data is also stored in the memory of the mobile device 24. The listing content captured by the wireless mobile device 24 may include any multimedia content.

The processor 52 may also be connected to an RF module 80 and antenna 82 for sending and receiving wireless communications. The RF module 80 may include a memory unit that serves as a buffer for communications purposes. It will be appreciated that the memory unit of the RF module 80 may be considered as part of the memory of the mobile device 24 and communications may be formed in the memory unit of the RF module 80. In an embodiment of the present disclosure, the RF module 80 and antenna 82 may send and receive wireless communications with the base station 38 (FIG. 1) via the communication link 36. The base station 38 may in turn provide a connection to a packet-switched network, such as the Internet, or to a PSTN. In an embodiment of the present disclosure, the RF module 80 and antenna 82 may provide a WI-FI connection to allow access to computer networks, such as a LAN. The mobile device 24 may further provide a port (not shown) for providing a wired connection to a computer or computer network. The mobile device 24 may further include a rechargeable battery (not shown) for providing a mobile power source. The mobile device 24 may further include a GPS module (not shown) for providing positional information to the processor 52.

Referring now back to FIG. 1, as previously mentioned, the mobile device 24 may be utilized by a user to create and post listing content in the listing database 16 such that it may be made available by the listing server 12 in listings sent to the remote computer 20. As previously mentioned, to become authorized to post listing content in the listing database 16, the user of the mobile device 24 may first be required to establish a user account and establish listing preferences, which may be subsequently stored in the user database 18 or at the mobile device 24. A new user may establish a user account with the listing server 12 through a web browser running on the mobile device 24 or some other computing device connected to the listing server 12 via the network 22. As part of the new user registration process, the user may be prompted to provide the necessary information to establish a user account, including contact information, a unique login ID, and a password.

The user may also be prompted to enter payment information, such as credit card information, for utilizing the services of the listing server 12. The operator of the listing server 12 may charge a flat fee. The operator of the listing server 12 may charge no fee at all. The operator of the listing server 12 may charge a percentage of the sales price for items sold through the listing server 12. Immediate payment may be required before listing content in the listing database 16 is available for viewing by third parties.

The user may be further prompted by the listing server 12 to provide listing preferences for use in association with listing content posted by the user in the listing database 16. The listing preferences may include information that is to be added to and included with the user's listing content stored in the listing database 16 by default. That is, the listing preferences may include information that is accessible, either directly or indirectly, to a third-party viewing listings at the remote computer 20. The listing preferences may include standard information that is provided with each of a user's listings by default, such as standard shipping information and shipping charges, standard return policies, standard contact information for the user, standard payment information, and standard pricing information.

The standard pricing information may include minimum prices, buy-it-now prices, reserve prices, and starting prices for items listed by the user on the listing server 12 such that the user may not have to manually enter pricing information for listings. The listing preferences may further include other information that may be utilized to manage the listings posted by the user in the listing database 16. The listing preferences may specify the length of time listing content is to be made available on the listing server 12. The listing preferences may specify listing templates that dictate the appearance, content, and format of the listing content. It will be appreciated that a benefit to the use of the listing preferences is that a user will not have to reenter the same information for each listing posted in the listing database 16.

In an illustrative embodiment of the present disclosure, a user of the mobile device 24 may not be required to first establish a user account directly with the listing server 12 as described above. Instead, the user may establish a user account using features provided by the mobile listing program product 64. In particular, upon its initial execution, the mobile listing program product 64 may prompt the user to enter the necessary information at the mobile device 24 for establishing a user account. This information may include a login ID, a password, a credit card number, and standard information, such as standard shipping information and shipping charges, standard return policies, standard contact information for the user, standard payment information, and standard pricing information. Once entered, the information may be provided to the listing server 12 and stored in the user database 18. The listing server 12 may verify certain information provided by the user for security purposes, including credit card information provided by the user. The user may also be prompted to enter listing preferences at the mobile device 24. The listing preferences entered by the user at the mobile device 24 may be applied by default to all future listing content either at the mobile device 24 or at the listing server 12.

Once a user has established a user account, the user may download and install the mobile listing program product 64 on the mobile device 24 from the listing server 12. The mobile listing program product 64 must be compatible with the operating system 60 of the mobile device 24. The download from the listing server 12 may occur over the communication link 36, the base station 38, and the network 22. The mobile listing program product 64 may be installed into the non-volatile memory 54 of the mobile device 24. In an embodiment of the present disclosure, the download may occur from a third-party server, such as a server associated with the manufacturer or service provider of the mobile device 24. In an embodiment of the present disclosure, the mobile listing program product 64 may be installed in the non-volatile memory 54 of the mobile device 24 at the time of purchase. In an embodiment of the present disclosure, the mobile listing program product 64 may be loaded onto the mobile device 24 from a computer or portable electronic storage medium connected to the mobile device 24 via a wired or wireless connection. To actually launch the mobile listing program product 64 on the mobile device 24, a user may navigate to an associated icon displayed on the display 26 using the navigation device 30 and select it using the selection button 32. Once the mobile listing program product 64 is running, a user may utilize the mobile device 24 to provide listing content to the listing server 12 as will now be described.

Figure 3:
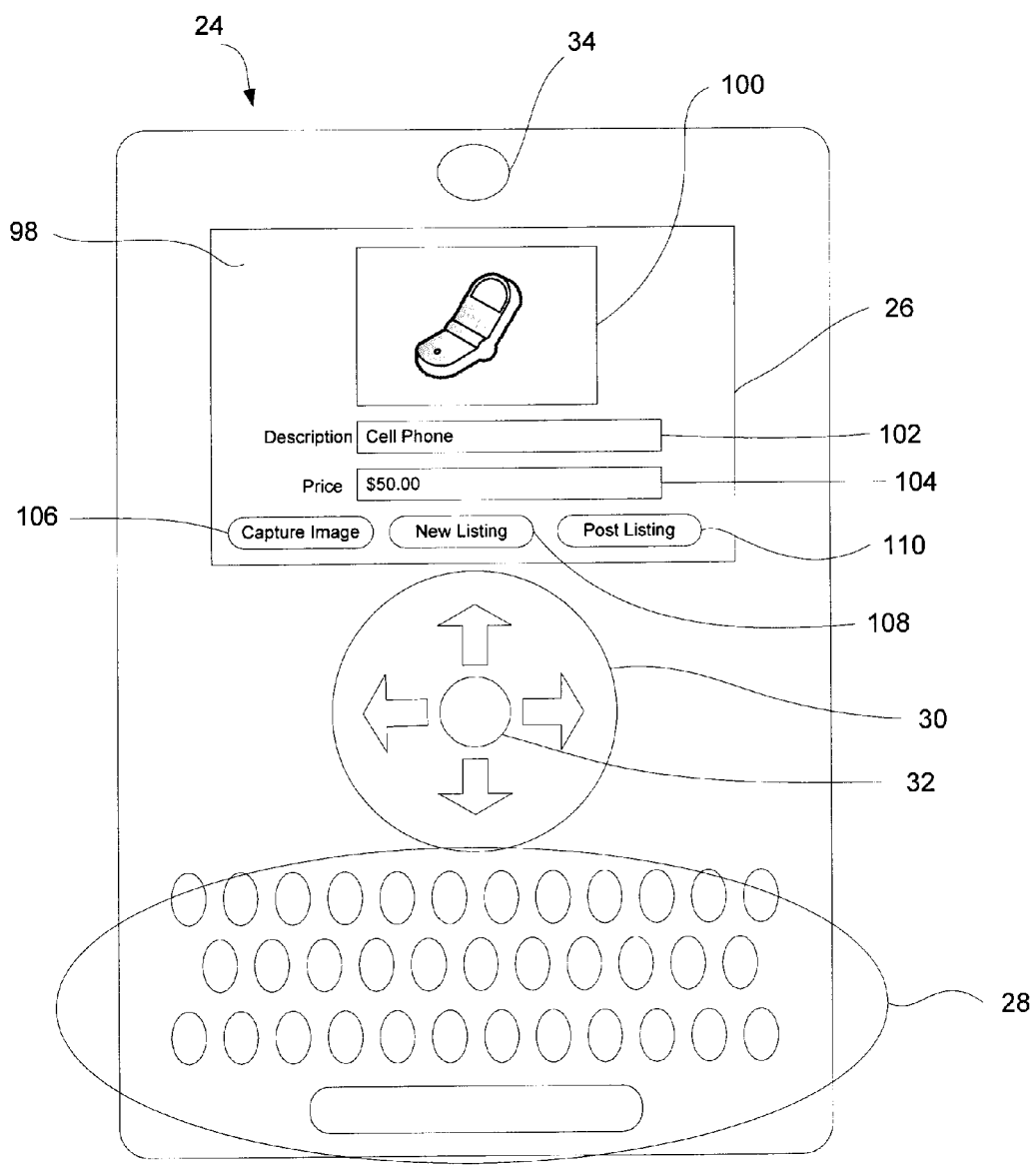
FIG. 3 is a diagram of the mobile device depicted in FIGS. 1 and 2 configured to capture listing content through an interface.

Referring now to FIG. 3, where like reference numerals depict like components, there is shown the mobile device 24 configured to allow a user to enter and capture listing content according to an embodiment of the present disclosure. The display 26 of the mobile device 24 may display an interface 98 having an image capture frame 100, text boxes 102 and 104, and virtual buttons 106, 108, and 110. The interface 98 may be a graphical user interface. It will be appreciated that the interface 98 is generated at the mobile device 24 and is not provided in a web page provided by the listing server 12. Thus, the interface 98 is generated in an "offline environment" by the mobile device 24. For example, the interface 98 is not generated in a web page running on a browser at the mobile device 24. Further, the interface 98 will facilitate capturing listing content as discrete data components, such as image data, text data, and audio data.

The image capture frame 100 may initially display a live image feed provided by the camera 34. When a user selects the virtual button 106, the image capture frame 100 may switch from displaying a live image feed from the camera 34 to a display of the image data captured by the camera 34 at the moment the virtual button 106 was selected. Further, upon selection of the virtual button 106, the image data captured by the camera 34 may be stored in an image file in the memory of the mobile device 24. The image data may be stored as part of the mobile listing program product data 66 in the non-volatile memory 54. The image file name for the image data captured by the camera 34 may be generated automatically by the mobile device 24. The image file name and path of the image file may be stored in association with the listing content for a single listing as will be described in relation to FIG. 4. In an illustrative embodiment of the present disclosure, the image capture frame 100 and the camera 34 may be utilized to capture image data in the form of a video. Thus, the concept of "image data" may include both data for still images and video.

Once an image of the desired item has been captured and stored in memory, a user may then enter a short description of the item shown in the image capture frame 100 into the text box 102 on the interface 98. A user may also enter a desired price for the item shown in the image capture frame 100 into the text box 104 of the interface 98. It will be appreciated that the captured image displayed in the image capture frame 100 and the information entered into the text boxes 102 and 104 constitute "listing content" for a single listing. If the user desires to create new listing content for another listing, the user may select the virtual button 108 and the mobile device 24 will capture and store the listing content currently being displayed in the mobile listing program product data 66 and then return the image capture frame 100 to the live feed from the camera 34 and clear the text boxes 102 and 104. The user may then repeat the above described process as many times as is needed to create listing content for as many listings as may be desired.

Figure 4:
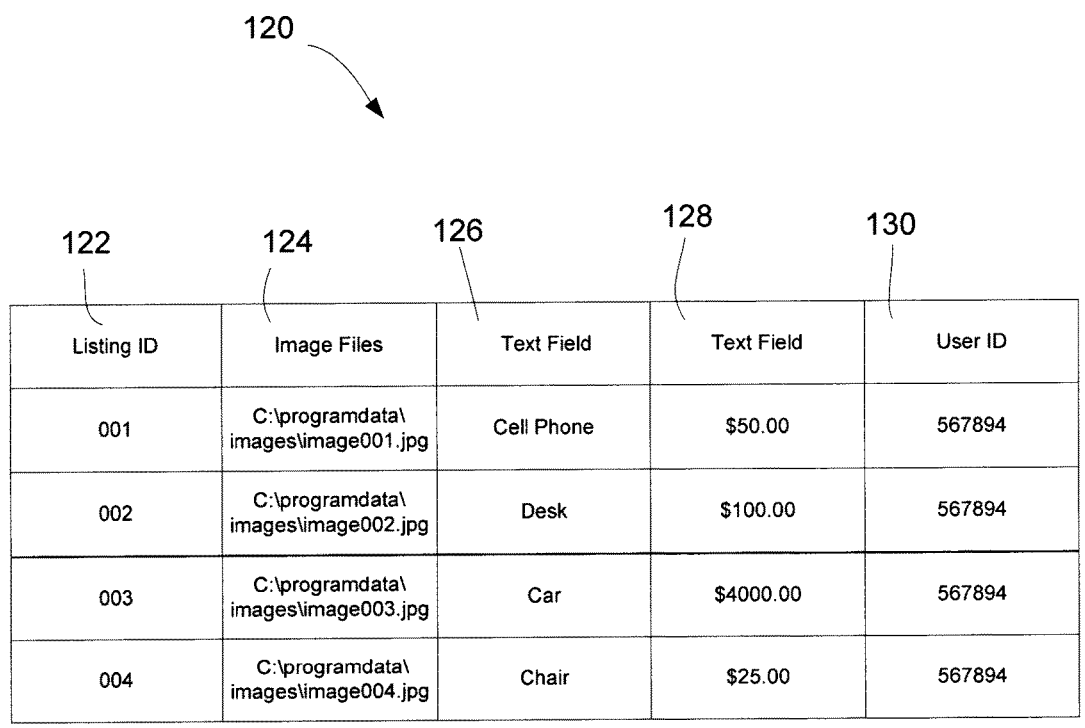
FIG. 4 is a diagram of a data array for storing listing content at the mobile device depicted in FIGS. 1, 2 and 3.

Referring now to FIG. 4, there is depicted an exemplary data array 120 for listing content for a plurality of listings stored in the mobile listing program product data 66 in the non-volatile memory 54 of the mobile device 24. The array 120 may comprise columns for Listing ID 122, Image Files 124, Text Field 126, Text Field 128, and User ID 130. The Listing ID 122 may identify the listing content for each listing by a unique identifier that allows both the mobile device 24 and the listing server 12 to track and manage the listing content. Listing IDs may be generated by the mobile device 24.

The Image Files 124 may comprise a path and file name for each image file associated with the unique identifier in the Listing ID 122. The Text Field 126 and the Text Field 128 may comprise text information entered by the user using the interface 98. The User ID 130 may identify the user by a unique identifier that created the listing content such that the listing content may be posted to the correct user account at the listing server 12.

It will be appreciated that the array 120 may be expanded to include additional text fields and other information, such as taxonomy or classification information, associated with each unique listing ID. Further, the Image Files 124 may identify a file name and path to more than one image file for each unique listing ID. Indeed, the array 120 may be adapted to conform to various types of listings, including classified listings, auction listings, blog listings, and social networking listings. The array 120 may be further adapted to include proposed listing content and information provided by listing preferences established by a user. The data for the Image Files 124, Text Field 126, and Text Field 128 may be considered discrete data components of the listing content.

Once the listing content for all of the listings desired to be posted by the user on the listing server 12 has been captured at the mobile device 24, the user may navigate to and select the virtual button 110 on the interface 98. Upon the selection of the virtual button 110, the mobile device 24 will automatically gather and provide the listing content for all of the listings just created by the user to the listing server 12 from the memory of the mobile device 24. For example, the mobile device 24 may provide the data indicated by the data array 120 to the listing server 12. This may include image files and text data entered by the user. Once received, the listing server 12 may automatically post the listing content in the listing database 16 such that it is immediately available to third-parties in listings. The listing preferences previously entered by the user may be applied to the listing content provided from the mobile device 24 when viewed by third parties in listings.

It will be appreciated that the listing content stored in memory at the mobile device 24 may be provided to the listing server 12 in a wide variety of manners. In an embodiment of the present disclosure, the mobile device 24 may upload the listing content in the array 120 to the listing server 12 via a direct connection with the listing server 12. That is, after the user has finished creating the desired listing content and selected the option to post the listing content at the listing server 12, the mobile device 24 will automatically establish a direct connection to the listing server 12 and automatically upload the listing content from the memory of the mobile device 24 directly to the listing server 12 where it is then stored in the listing database 16.

In an illustrative embodiment of the present disclosure, the mobile device 24 may provide the listing content in the array 120 to the listing server 12 via e-mail. That is, the mobile device 24 may automatically generate an e-mail addressed to a pre-specified e-mail address associated with the listing server 12. The subject field in the e-mail header may include a unique identifier for the user such that the listing content in the e-mail may be associated with the appropriate user account at the listing server 12. The body of the e-mail may comprise, in a pre-specified format, the listing content. Attachments to the e-mail may include the necessary image files associated with the listing content. When an e-mail sent by the mobile device 24 is received at the listing server 12, the listing server 12 is able to identify the user account to which the included listing content pertains. Further, the listing server 12 is able to decompose the e-mail body and image file attachments such that it may correctly post the listing content in the listing database 16.

In an illustrative embodiment of the present disclosure, the mobile device 24 may provide the listing content indicated by the array 120 to the listing server 12 using the SMS communications protocol. That is, the mobile device 24 may automatically generate an SMS message to a pre-specified address. The body of the message may contain listing content as well as an identification of the user. When received, the listing server 12 is able to decompose the message body of the SMS message such that it may post the listing content in the listing database 16 under the appropriate user account and in accordance with any listing preferences. One drawback to the use of the SMS communications protocol is the inability to transfer digital images. Thus, the user may be required to provide the digital images in some other manner, if needed.

In an illustrative embodiment of the present disclosure, the mobile device 24 may provide the listing content indicated by the array 120 to the listing server 12 using the MMS communications protocol. It will be appreciated that an advantage of the MMS standard over the SMS standard is the ability to include multimedia content, e.g., digital images, along with text. Thus, the listing content in an MMS message generated by the mobile device 24 may include both the desired text information as well as the images captured by the camera of the mobile device 24. The MMS message may be automatically generated by the mobile device 24 pursuant to a pre-specified format. In addition, the use of the pre-specified format will allow the listing server 12 to extract the listing content and post it correctly in the listing database 16. It will be appreciated that listing content provided in a single MMS message sent from the mobile device 24 may contain images and textual information for multiple listings or a single listing.

It will be appreciated that using the above described processes, that a user may be able to create listing content for posting on the listing server 12 in as little as 10 to 30 seconds using the mobile device 24. The user need only capture the image using the mobile device 24 and enter a short description or statement in the provided text boxes 102 and 104 on the interface 98. In some instances, a user may only provide an image. In other instances, the user may only provide text.

The mobile device 24 will automatically form a communication in its memory with the listing content and transmit the communication with the listing content to the listing server 12 with only a single selection of the user on the user interface 98. Upon receipt, the listing server 12 will then post the listing content in the listing database 16 automatically and in accordance with any listing preferences previously specified by the user, which preferences may be stored at the listing server 12 or received in conjunction with the listing content from the mobile device 24.

It will be appreciated that the mobile device 24 automatically associates the correct image files with the corresponding textual information entered by a user for a listing. Thus, there is no need for a user to manually associate image files and textual information. Further, the user may create listing content for a single listing or multiple listings using the mobile device 24. The mobile device 24 may allow a user to generate and automatically associate listing content while "offline" from the listing server 12. It will be appreciated that there is no need for a user to manually browse the file directory of the mobile device 24 to locate image files for uploading to the listing server 12 using a file uploader service provided by a website. That is, because the images are captured from within the mobile listing program product 64 running on the mobile device 24, the image file names and locations in the non-volatile memory 54 are already known and, therefore, the image files may be automatically included with the associated textual information entered by the user when provided to the listing server 12. It will be further appreciated that the above described process may be easily adapted for use with classified listings, auction listings, partner/vendor listings, affiliate listings, blog listings, and social networking listings.

The creation of the listing content at the mobile device 24 may be partially or fully automated to provide additional benefit to users. That is, the mobile device 24 may automatically generate proposed listing content based upon input from the user or from some other source. For example, the mobile device 24 may be able to automatically provide descriptive information, stock images, pricing information, and comparison data based upon received input.

In an illustrative embodiment of the present disclosure, the camera 34 on the mobile device 24 may function to read and capture barcode information of an item for which a listing is desired to be created. The captured barcode information may be utilized to identify the item and provide information from a local or remote database which may then be selected, if desired by the user, for inclusion with the listing content for the item. In particular, once captured, the mobile device 24 may provide the barcode information to the listing server 12 (or some other available service). The listing server 12 may then return useful listing information about the item based upon its barcode information. The mobile device 12 may prompt the user to include the information returned from the listing server 12 in the listing content associated with the item. The information returned from the listing server 12 may include proposed listing content, such as descriptive information, stock images, pricing information, and comparison data. In lieu of using barcode information to automate the listing process, the input may instead comprise any one of an SKU number, product name, or any other information that may be utilized to provide useful information in the listing creation process.

In an illustrative embodiment of the present disclosure, the listing server 12 may send automatically generated communications to the mobile device 24 as part of the listing creation process. The communications generated by the listing server 12 may comprise a preview of listings or a hyperlink to listing previews created from the listing content provided by the user through the mobile device 24. In addition, the communications may include proposed listing content based upon information received at the listing server 12. The proposed listing content may be determined from the listing content received from the mobile device 24. For example, the listing server 12 may process the listing content received from the mobile device 24 and determine proposed listing content based upon key words in the listing content received from the mobile device 24.

In response to being presented with proposed listing content, the user may accept, reject or modify the proposed listing content in replies to the communications from the listing server 12. In an illustrative embodiment of the present disclosure, the communications generated by the listing server 12 may contain proposed listing content, or a hyperlink to proposed listing content, for inclusion with the listing content provided by the user through the mobile device 24. For example, the communications generated by the listing server 12 may include proposed listing content, such as additional descriptive information, stock images, pricing information, and comparative data. The user may respond to the communications in a pre-designated and indicated manner such that the listing content provided by the user through the mobile device 24 is supplemented and augmented by the proposed listing content. That is, the proposed listing content in the communications may be added to the listing content provided by the user upon an appropriate user response. The proposed listing content may also be provided in the form of a preview of a listing generated by the listing server 12.

The listing server 12 may further generate proposed listing content from descriptive product information received from the mobile device 24. The descriptive product information may include information that may be used to identify a product but is not necessarily included with in a listing, such as a description of a product, a name of a product, or a model number of a product. The descriptive product information may include information acquired from a scannable label on the product, such as a barcode, or even a digital representation of a barcode. The descriptive product information may include a Universal Product Code (UPC) or any other identifier capable of identifying a product. The descriptive product information may be entered or captured by a user of the mobile device 24. Again, the listing server 12 may access a third-party service in order to provide the proposed listing content, such as a service that maintains product information based upon barcodes.

In an illustrative embodiment of the present disclosure, the mobile device 24 may capture barcode information, or other descriptive product information, and provide it to the listing server 12. The listing server 12 may then generate proposed listing content from the barcode information, or other descriptive product information. The proposed listing content may then be provided to the user at the mobile device 24 or some other device. The proposed listing content may be included in a communication or a hyperlink to the proposed listing content may be provided. The user may then accept or reject the proposed listing content through an interface. The user may also edit or supplement the proposed listing content if necessary through the interface. Once accepted, the proposed listing content may be posted in the listing database in association with a user account of the user of the mobile device 24. In this manner, the user only need capture the barcode information, or other descriptive product information, to form listing content in the listing database 16.

In an illustrative embodiment of the present disclosure, the mobile device 24 may allow the user to receive proposed listing content in the form of listing templates for facilitating the creation of listing content. The listing templates may include, among others, stock images, stock descriptions, and stock pricing information. The listing templates may be derived from previous listing content posted by a user. That is, previously entered listing content may provide a useful template if the products being listed in the new listing and the old listing are the same.

A user may select to use a template and then provide any remaining and necessary listing content. In an illustrative embodiment of the present disclosure, stock listing templates may be provided by the listing server 12, as part of the mobile listing program product 64, or by the user. That is, the mobile device 24 may allow a user to create proposed listing content in the form of listing templates.

The mobile device 24 may also prompt a user to enter or select taxonomy or categorical information in association with listing content. The taxonomy or categorical information may facilitate searching listings provided by the listing server 12. In addition, the proposed listing content provided by the listing server 12 may include proposed taxonomy or categorical information for listing content.

In an illustrative embodiment of the present disclosure, the mobile device 24 may allow a user to post listing content in the listing database 16 such that it is available to third parties immediately. In an illustrative embodiment of the present disclosure, the mobile device 24 may allow the user to save the listing content as "pending" either in the memory of the mobile device 24, or in the listing database 16, without making it available for viewing by third parties until later authorized by the user. For example, a user may desire to further supplement the listing content or review it at a later date before making the listing content available to third parties on the listing server 12. Listing content that has been saved, but not made available to third parties on the listing server 12, may be flagged as "pending" or "drafts" and may be recalled by a user for subsequent modification and posting in the listing database 16.

In an illustrative embodiment of the present disclosure, the listing server 12 may employ various security and verification procedures to ensure the integrity of the listings posted by users in the listing database 16. In an illustrative embodiment of the present disclosure, the listing server 12 may impose limits on the number of listings allowed by a user at any given time. Further, the listing server 12 may maintain and track a user rating based upon feedback information provided from third parties or from other sources. Based upon the feedback information, the listing server 12 may suspend a user's ability to post listings or, if the feedback is positive, the listing server 12 may increase the number of permitted listings of the user. The listing server 12 may immediately charge users a set fee prior to allowing listing content in the listing database 16 to be made available over the network 22. Further, the listing server 12 may allow users to post listings both manually, i.e., through a web interface, and using the mobile listing program product 64 running as a software application on the mobile device 24.

In an exemplary embodiment of the present disclosure, the mobile device 24 provides a user with an interface for browsing, searching, and viewing the listings hosted in the listing database 16. The interface on the mobile device 24 may further allow a user to interact with the listings in the appropriate manner. For example, the interface on the mobile device 24 may allow a user to purchase or place bids on the items contained in the listings stored in the listing database 16. In an exemplary embodiment of the present disclosure, the interface that allows a user to browse, search, view and interact with the listings stored in the listing database 16 may be generated by the mobile listing program product 64 when it is executed by the processor 52. In this manner, it will be appreciated that the same application running on the mobile device 24 allows a user to both post listings in the listing database 16 and to browse, search, view and interact with listings posted by others in the listing database 16. For example, the mobile device 24 may allow a user to post and view listings in relation to an e-commerce website, such as those hosted and operated by EBAY, OVERSTOCK.COM, and UBID.

Figure 5:
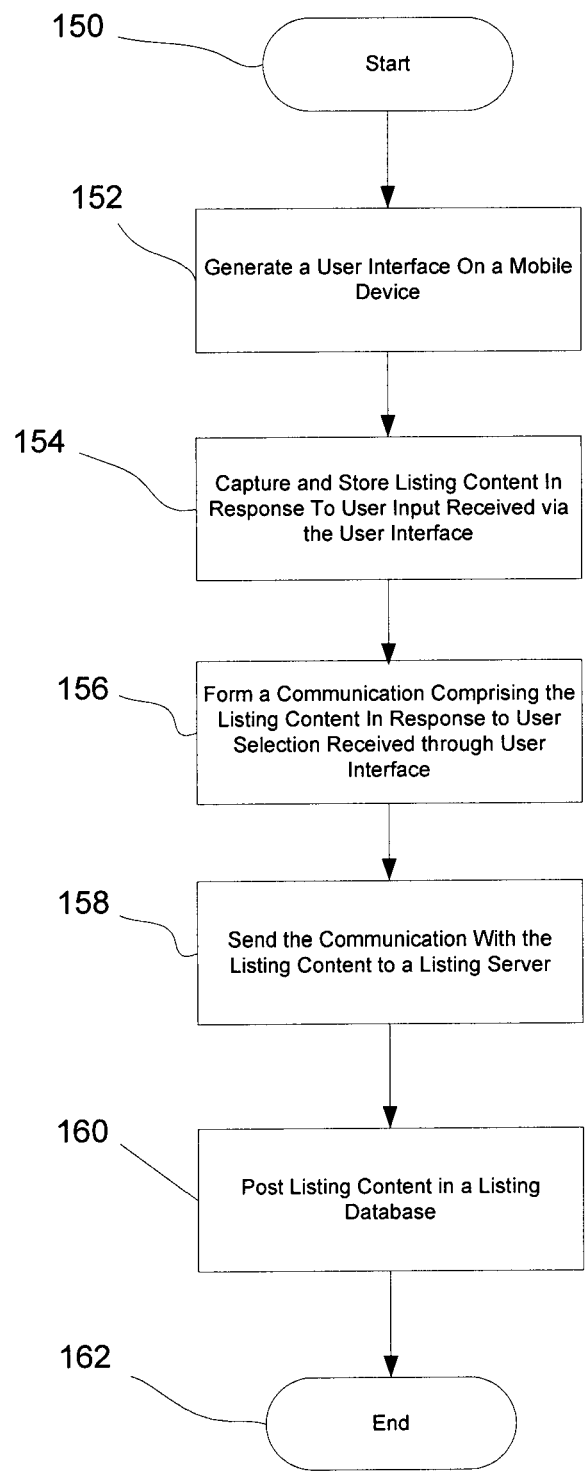
FIG. 5 illustrates a high level logical flowchart of an exemplary process by which a mobile device can process user input to create listing content.

FIG. 5 illustrates a high level logical flowchart of an exemplary process by which the mobile device 24 can process user input to create listing content in accordance with an embodiment of the present invention. As illustrated, the process begins at block 150, for example, when a user launches an application on the mobile device 24. The application may be launched by selecting an icon on the display 26 associated with the mobile listing program product 64 such that the processor 54 of the mobile device 24 may execute computer-readable instructions associated with the mobile listing program product 64. The mobile device 24 next generates, at block 152, a user interface on the mobile device 24. The user interface may be a graphical user interface that allows the mobile device 24 to capture and store listing content in response to user input received through the interface as indicated at block 154. It will be appreciated that the user input received through the user interface on the display 26 may involve a user interacting with the user interface using the keyboard 72, navigation 73, and selection 74 of the wireless mobile device 24. The user interface is generated in an offline environment at the mobile device 24. Further, the listing content may be captured in the offline environment through the user interface.

The listing content captured and stored by the mobile device 24 may comprise both text data and image data. The image data may be captured by a camera of the mobile device 24 and stored in image files pursuant to an image format, such as the JPEG format, in memory at the mobile device 24. The name of the image files may be automatically generated by the mobile device 24 and the image files may be stored in the memory of the mobile device 24 at a location that is recorded in association with the listing content.

For example, the user may take a digital image of an item for sale using the mobile device 24 using selections on the interface on the display 26. Text data may also be input by the user through the interface on the display 26. The text data may be entered through the keypad 28 and may comprise a short description and perhaps a price of the item depicted in the captured image data. The text data and the image file with the captured image data may be automatically and logically associated together as listing content for a single listing by the mobile device 24. Further, the text data and the image data may be associated with a user account in the memory of the mobile device 24.

At block 156, the mobile device 24 may form a communication comprising the listing content in response to a user selection received through the user interface on the mobile device 24. For example, the user may navigate to and select a virtual button on the interface which causes the mobile device 24 to automatically form the communication. That is, the communication may be formed automatically, without the need for the user to manually associate the image data and the text data. In an illustrative embodiment of the present disclosure, the communication may comprise a format suitable for direct upload to a listing server using a direct link. In an illustrative embodiment of the present disclosure, the communication may comprise an e-mail. In an illustrative embodiment of the present disclosure, the communication may comprise an SMS message. In an illustrative embodiment of the present disclosure, the communication may comprise an MMS message. The communication may optionally include an identification of a user account such that the listing content will be posted to the correct user account.

At block 158, the mobile device 24 may send, transmit or otherwise provide the communication with the listing content to a listing server. If, for example, the communication is being uploaded by a direct network connection, the mobile device 24 may first automatically establish the direct network connection between the mobile device 24 and the listing server. The IP address of the listing server may be preprogrammed and stored at the mobile device 24 such that no user input is required. If, for example, the communication comprises an e-mail, then the mobile device 24 may send the e-mail to an e-mail address associated with a listing server. Again, the e-mail address may be preprogrammed and stored at the mobile device 24 such that no further user input is required to automatically send the e-mail. If, for example, the communication comprises and SMS message or an MMS message, then the mobile device 24 may automatically send the SMS or MMS message to an address preprogrammed and stored at the mobile device 24 for a listing server.

At block 160, a listing server receiving the communication from the mobile device 24 may post the listing content contained in the communication in a listing database such that it is made available to third parties over a network, such as the Internet. For example, a third party may view the listing content in listings provided in web pages in response to a request received at the listing server.

The listing content may also be associated with the appropriate user account as indicated by any user account information in the communication from the mobile device 24. In an embodiment of the present disclosure, the listing server may comprise one of an e-commerce website, a blogging website, or a social networking website. In an embodiment of the present disclosure, a credit card of the user posting the listing content from the mobile device 24 may be immediately charged for the services provided by the listing server, e.g., making the listing content available on a network to third parties. In an illustrative embodiment of the present disclosure, the listing server may also facilitate business transactions for the items depicted and described in the listing content. Following block 160, the process terminates at block 162.

Figure 6:
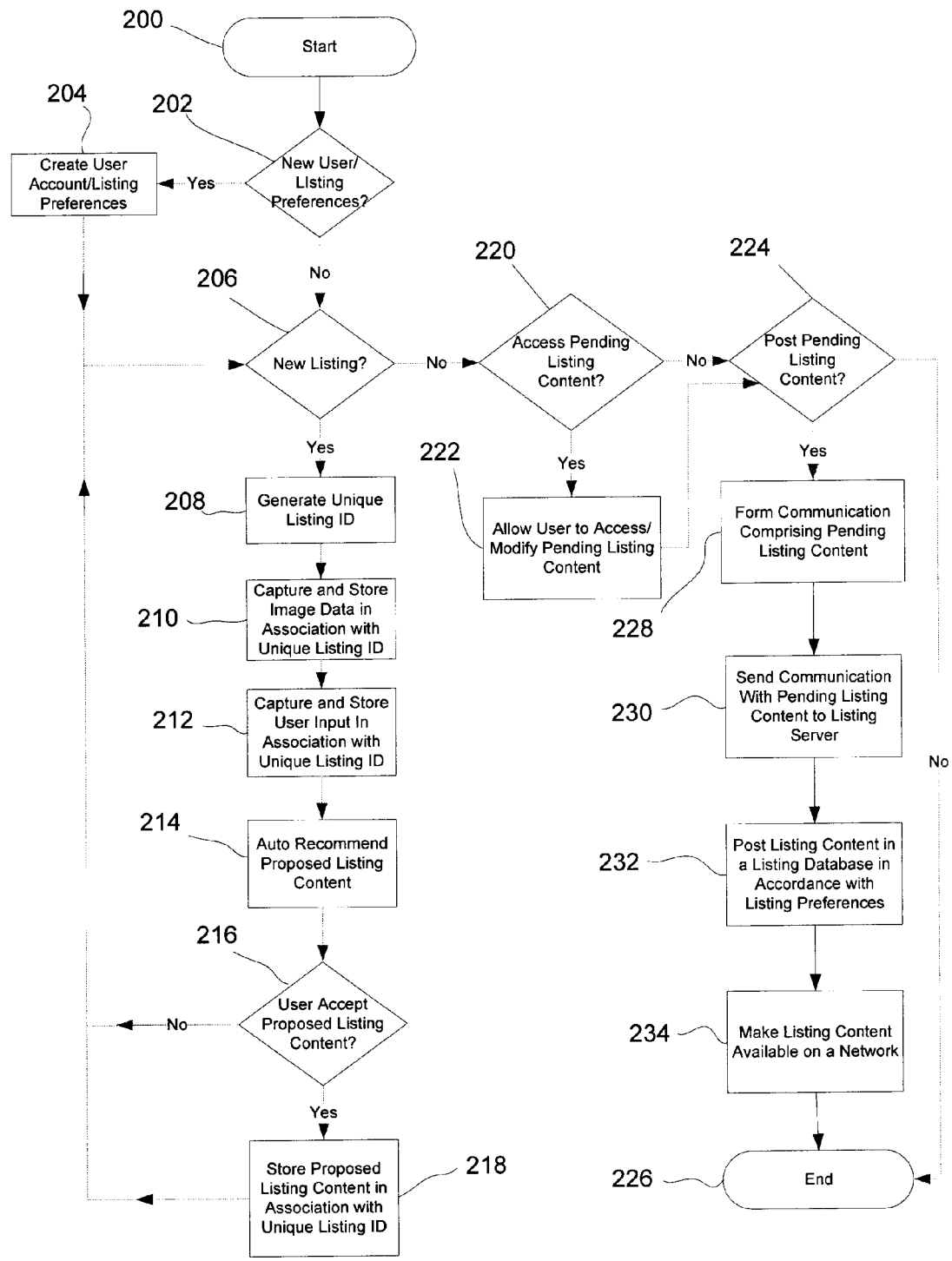
FIG. 6 illustrates a high level logical flowchart of an exemplary process by which a mobile device can process user input to create listing content.

FIG. 6 illustrates a high level logical flowchart of an exemplary process by which the mobile device 24 can process input to create listing content in accordance with an embodiment of the present invention. As illustrated, the process begins at block 200, for example, when a user launches an application on the mobile device 24. The application may be launched by selecting an icon on the display 26 associated with the mobile listing program product 64 such that the processor 54 of the mobile device 24 may execute computer-readable instructions associated with the mobile listing program product 64. At block 202, the mobile device 24 may first determine whether or not the user is a new user or whether or not the user desires to establish or modify listing preferences. If the user is a new user or if the user desires to establish or modify listing preferences, then the process passes to block 204, if not, then the process passes to block 206. At block 204, the process may allow a user to establish a new user account. In particular, the user may be prompted to enter any required personal information and optionally payment information. Further, at block 204, the user may be allowed to establish/modify listing preferences for any listing content submitted by the user through the mobile device 24 to a listing server. The listing preferences may include standard information to be included with listings for the listing content posted by the user. The listing preference may include standard formatting. The listing preferences may be stored locally at the mobile device 24 or may be provided to a listing server. After block 204, the process then passes to block 206.

At block 206, the mobile device 24 may prompt the user as to whether or not the user wants to generate listing content for a new listing. If yes, the process proceeds to block 208 where the mobile device 24 may first automatically generate a unique listing ID for managing and associating listing content for a single listing. At block 210, the mobile device 24 may capture and store in its memory image data in association with the unique listing ID. The image data may be captured by the camera 34 of the mobile device 24. The mobile device 24 may automatically generate an image file name for the image data. The mobile device 24 may further store the image file in a pre-designated file directory of the mobile device 24 such that the image file may be accessed and retrieved by the mobile device 24 without the need for user input.

At block 212, the mobile device 24 may capture and store in its memory user input, such as text data. The mobile device 24 may associate the text data with the unique listing ID and the image data captured at block 210. The data and user input captured and stored at blocks 210 and 212 may be considered listing content for a single listing. Further, the listing content, i.e., the image data and the text data are captured as discrete data components that are automatically associated together by the mobile device 24 such that there is no need for a user to manually associate the discrete data components of the listing content. Thus, it will be appreciated that, because the image data captured at block 210 and the text data captured at block 212 are associated with the same unique listing ID, the image data and the text data are automatically and logically associated with each other in the memory of the mobile device 24. That is, there is simply no need for a user to manually associate the image data with the text data, i.e., the discrete data components of a listing, as it is done automatically by the mobile device 24.

At block 214, the mobile device 24 may automatically recommend proposed listing content. In an embodiment of the present disclosure, the proposed listing content may be based on, and in response to, a processing of the user input entered at block 212. For example, the prosed listing content may comprise additional stock information, including image and descriptive information that may supplement the user input entered at block 212. The proposed listing content may include comparative data, such as comparative pricing data, such that a user may make an informed decision regarding any pricing entered by the user. In an embodiment of the present disclosure, the proposed listing content may include taxonomy or classification data. In an embodiment of the present disclosure, the proposed listing content may comprise a title for the listing content. If the mobile device 24 is GPS enabled, the proposed listing content may comprise location information determined from GPS information. It will be appreciated that the mobile device 24 may access a server to provide the proposed listing content.

At block 216, the mobile device 24 may receive user input as to whether or not the user accepts the proposed listing content. (The user may edit or modify the proposed listing content at block 216.) If yes, then at block 218, the process stores the proposed listing content in association with the unique listing ID and then the process loops back to block 206 where the user may decide whether or not to create another listing, i.e., repeat the loop beginning at block 208. If no at block 216, then the process also loops back to block 206.

If the user decides not to create a new listing at block 206, then the process proceeds to block 220, where the mobile device 24 may prompt the user to indicate whether the user wants to modify any pending listing content stored in memory at the mobile device 24. The pending listing content may be any listing content that has not be provided to a listing server. If the user elects to access pending listing content at block 220, the process will allow the same at block 222. At block 222, the user may modify, edit or delete any pending listing content.

If no at block 220, and after block 222, the process proceeds to block 224 where a user is prompted on the mobile device 24 to elect whether to post any pending listing content on a listing server. If no, the process may end at block 226. If yes at block 224, the process may then automatically form a communication at block 228. The communication may comprise the pending listing content stored in the memory of the mobile device 24 (which may also include the proposed listing content, if added by the user). The communication may further comprise user account information such that the listing content may be associated with the correct user account at a listing server. The communication may further comprise any listing preferences entered by the user at block 204, if not previously sent. In an embodiment of the present disclosure, the communication formed at block 228 may be suitable for direct upload to a listing server over a network. In an embodiment of the present disclosure, the communication may comprise an e-mail. In an embodiment of the present disclosure, the communication may comprise an SMS message or an MMS message.

It will be appreciated that the listing content in the communication formed at block 228 may be automatically included. That is, there is no need for a user to manually select the listing content to be included in the communication from the memory of the wireless mobile device 24. For example, there is no need for a user to manually select, enter, or attach listing content, such as the image data captured at block 210 and the text data captured at block 212, for inclusion in the communication. Further, there is no need for a user to manually enter a unique destination, such as an IP address, for the communication. The communication formed at block 228 may be in response to a single user selection made through an user interface on the mobile device 24.

At block 230, the communication with the pending listing content is provided or transmitted to a listing server. The communication may be provided or transmitted automatically after the communication has been formed at block 228. At block 232, the listing content in the communication is extracted and posted in a listing database in accordance with the listing preferences specified by the user. The listing content stored in the listing database may include any proposed listing content accepted by the user at blocks 216 and 218. At block 234, the listing content may then be made available to third parties over a network. The process may end at block 226.

Figure 7:
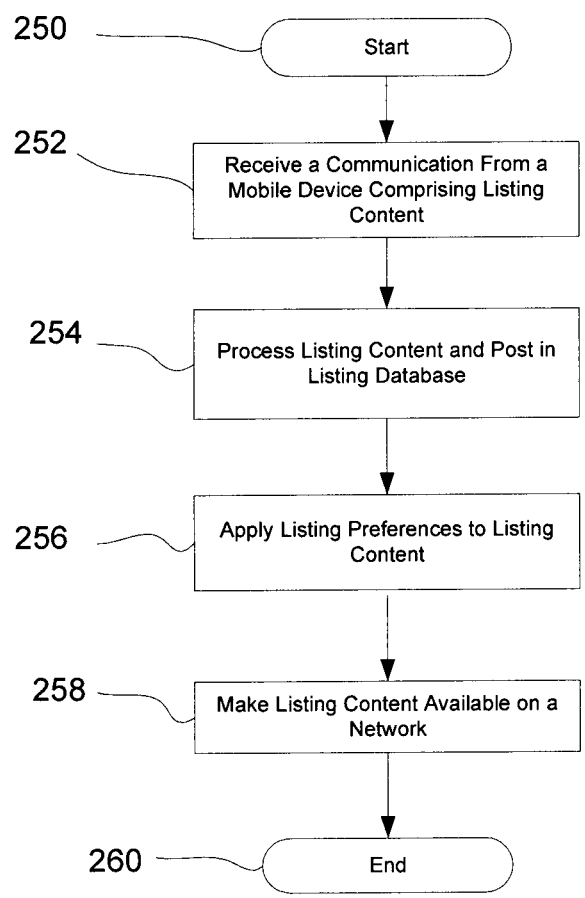
FIG. 7 illustrates a high level logical flowchart of an exemplary process by which a listing server can process communications to create listing content in a listing database.

FIG. 7 illustrates a high level logical flowchart of an exemplary process by which the listing server 12 can process communications to create listing content in a listing database in accordance with an embodiment of the present invention. The listing server 12 may comprise one of an e-commerce server, a blogging server, and a social networking server. The listing server 12 may comprise a program product. As illustrated, the process begins at block 250, for example, when the listing server 12 is connected to a network, such as the Internet, and a program product stored in memory at the listing server 12 is executed. At block 252, the listing server 12 may receive a communication from a mobile device or other computing device. The mobile device may comprise a camera for capturing image data. The mobile device may also allow a user to enter text data through an interface. The communication may be formed at the mobile device pursuant to a format understood by the listing server 12.

The communication itself may comprise listing content for one or more listings. The listing content in the communication may be organized by unique listing IDs and associated with each of the listing IDs may be listing content such as text data and image data for a single listing. The communication may further comprise user account information and payment information. The communication may further comprise listing preferences established by a user of the mobile device that sent the communication. The communication received at block 252 may comprise various types of communication, such as a direct and automatic upload from a mobile device to the listing server 12, an e-mail, an SMS message, and an MMS message.

At block 254, the listing server 12 may process the listing content in the communication received at block 252 and post the listing content in a listing database. The listing content in the listing database may be associated with the user account as indicated by any user account information in the communication. At block 256, any associated listing preferences may be applied to the listing content. At block 258, the listing content posted in the listing database may be made available on a network, such as the Internet. That is, the listing content in the listing database may be accessible from remote computers by third parties. The process ends at block 260.

Figure 8:
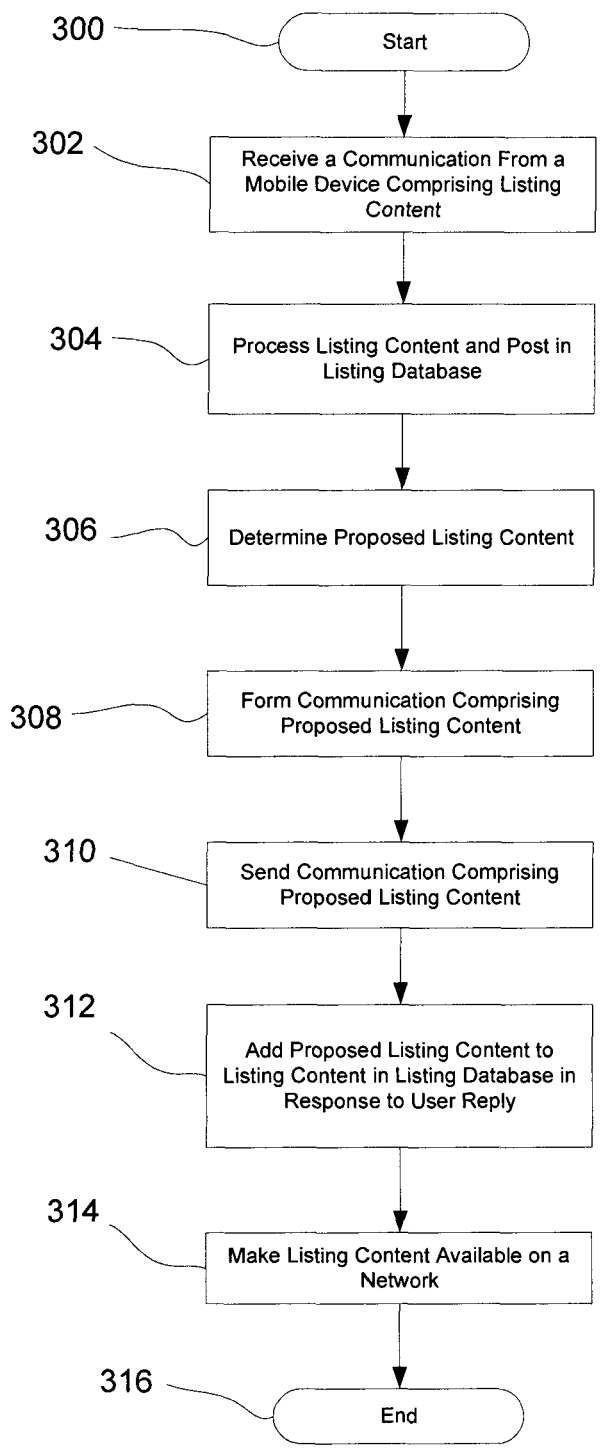
FIG. 8 illustrates a high level logical flowchart of an exemplary process by which a listing server can process communications to create listing content in a listing database with proposed listing content.

FIG. 8 illustrates a high level logical flowchart of an exemplary process by which the listing server 12 can process communications to create listings in a listing database with proposed listing content in accordance with an embodiment of the present invention. As illustrated, the process begins at block 300, for example, when the listing server 12 is connected to a network, such as the Internet. At block 302, the listing server 12 may receive a communication from a mobile device over a network. The mobile device may comprise a camera for capturing image data through an interface. The mobile device may also allow a user to enter text data through the interface. The communication may be formed at the mobile device pursuant to a format understood by the listing server.

At block 304, the listing server 12 may process the listing content in the communication and post the listing content in a listing database. At block 306, the listing server 12 may determine proposed listing content based upon the listing content received in the communication. The proposed listing content may include standard information, such as stock images and stock information. The proposed listing content may include taxonomy or categorical information. The proposed listing content may comprise comparative information, such as comparative pricing information. At block 308, the listing server 12 may form a communication to the mobile device that sent the communication received at block 302. The communication comprises the proposed listing content. In an embodiment of the present disclosure, the communication may comprise an e-mail, SMS message, or an MMS message. At block 310, the communication formed at block 308 is sent.

At block 312, the proposed listing content, or a modified version thereof, is added to the listing content in the listing database in response to an affirmative user reply to the communication sent at block 310. For example, a user of the mobile device may receive and review the communication sent at block 310 at the mobile device. The user may then respond in a manner indicated in the communication to accept the proposed listing content determined by the listing server 12. At block 314, the listing content, including any proposed listing content accepted for inclusion by a user, is made available on a network to third parties from the listing database of the listing server 12. The process ends at block 316.

Figure 9:
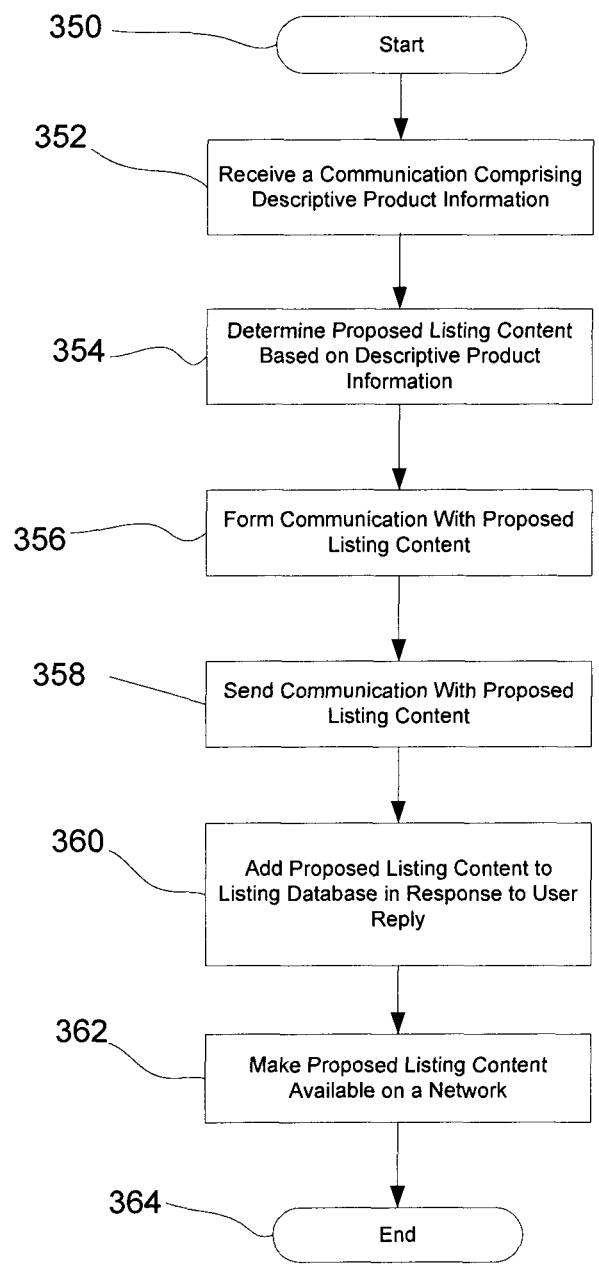
FIG. 9 illustrates a high level logical flowchart of an exemplary process by which a listing server can process communications with descriptive product information to create proposed listing content.

FIG. 9 illustrates a high level logical flowchart of an exemplary process by which the listing server 12 can process communications with descriptive product information to create proposed listing content in accordance with an embodiment of the present invention. As illustrated, the process begins at block 350, for example, when the listing server 12 is connected to a network, such as the Internet. At block 352, the listing server 12 may receive a communication comprising descriptive product information and user account information. In an embodiment of the present disclosure, the communication may comprise a direct upload to the listing server 12 via a direct connection over a network. In an illustrative embodiment of the present disclosure, the communication may comprise an e-mail. In an illustrative embodiment of the present disclosure, the communication may comprise an SMS message or an MMS message.

At block 354, the listing server 12 may determine proposed listing content based upon the descriptive product information received at block 352. In an illustrative embodiment of the present disclosure, the listing server 12 may access a third-party server that maintains information that may be formatted into the proposed listing content. For example, the third party server may be a service that is able to provide information to the listing server 12 based upon barcode information. At block 356, the listing server 12 may form a communication with the proposed listing content or with a hyperlink to the proposed listing content. The proposed listing content may include a preview of a proposed listing. At block 358, the proposed listing content, or a hyperlink to the proposed listing content, is sent in a communication to an address associated with the user account information. At block 360, the proposed listing content determined at block 354 is added to a listing database in response to a user reply to the communication sent by the listing server at block 358. (Alternatively, at block 360, the user may accept, reject, or modify the proposed listing content through a hyperlink.)

The user reply may be made in accordance with response instructions included with the communication sent at block 358. In addition, at block 360, any listing content provided in the user reply (or through a hyperlink), including modifications to the proposed listing content, may also be added to the listing database. At block 362, the proposed listing content is made available as listing content on a network, such as the Internet, to third parties for viewing at remote computers. The process ends at block 364.

Figure 10:
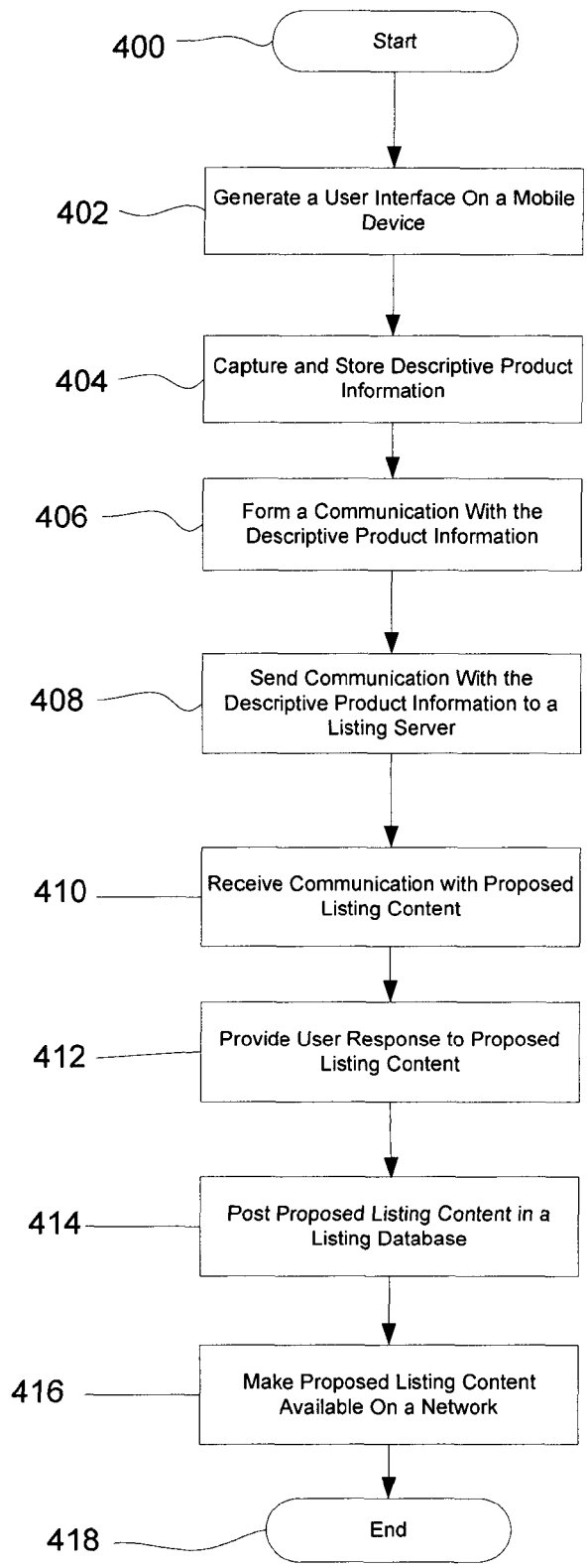
FIG. 10 illustrates a high level logical flowchart of an exemplary process by which a mobile device can receive and process proposed listing content.

FIG. 10 illustrates a high level logical flowchart of an exemplary process by which the mobile device 24 can receive and process proposed listing content in accordance with an embodiment of the present invention. As illustrated, the process begins at block 400, for example, when a user launches an application on the mobile device 24. The application may be launched by selecting an icon on the display 26 associated with the mobile listing program product 64 such that the processor 54 of the mobile device 24 may execute computer-readable instructions associated with the mobile listing program product 64. The mobile device 24 next generates, at block 402, a user interface on the mobile device 24 in an offline environment. That is, the user interface is not contained a web page displayed in a web browser running on the mobile device 24. The user interface may be a graphical user interface that allows the mobile device 24 to capture and store descriptive product information in response to user input received through the interface as indicated at block 404. At block 404, the user may also enter information to identify a user account associated with the user.

The descriptive product information captured and stored by the mobile device 24 at block 404 may comprise at least one of text data and image data. The descriptive product information may include information that may be used to identify a product, such as a description of a product, a name of a product, or a brand and model number of a product. The descriptive product information may include information acquired from a scannable label associated the product, such as a barcode, or even a digital representation of a barcode. The descriptive product information may include a Universal Product Code (UPC) or any other identifier capable of identifying a product.

At block 406, the mobile device 24 may form a communication to a listing server comprising the descriptive product information. The communication may further include any necessary user account information. The communication may be sent to a listing server at block 408 by the mobile device 24 in a wide variety of manners, including direct connection to the listing server, via e-mail, via an SMS message, or via an MMS message. At block 410, the mobile device 24 may receive back from the listing server a communication comprising proposed listing content determined from the descriptive product information. The communication received back at block 410 may be provided in the similar manner in which the communication is sent at block 408. In an embodiment of the present disclosure, the communication received at block 410 may provide a hyperlink to the proposed listing content. The communication received at block 410 may further indicate a desired response from the user to accept, reject, or modify the proposed listing content. The proposed listing content may include comparative pricing information.

At block 412, the user may review, modify, and accept the proposed listing content using the mobile device 24 by sending a communication indicating the same to the listing server. At block 414, the proposed listing content is posted in a listing database in association with a user account associated with the user of the mobile device 24 that sent the descriptive product information at block 404. At block 416, the proposed listing content is made available to third parties over a network by the listing server. The process ends at step 418.

Figure 11:
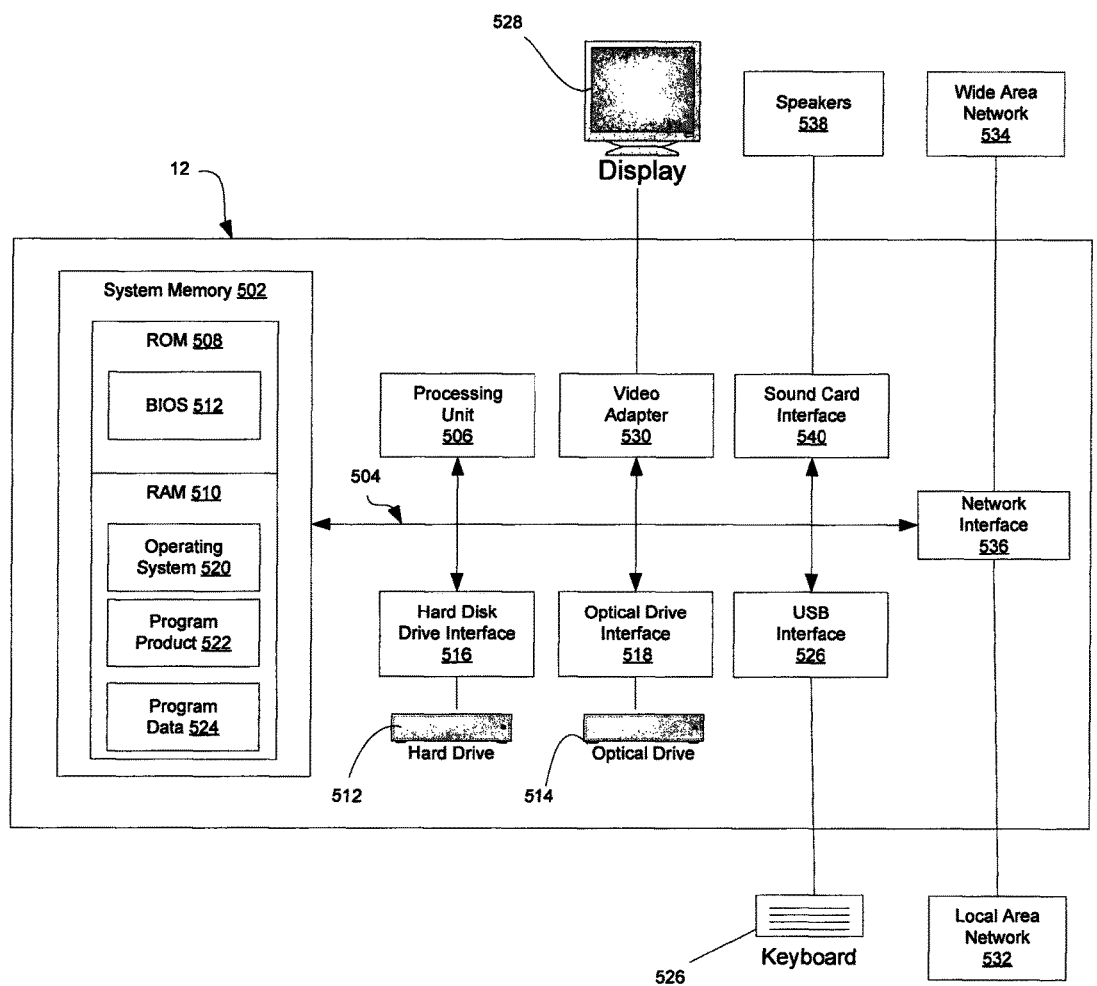
FIG. 11 is a block diagram of an exemplary architecture for a listing sever.

Referring now to FIG. 11, there is depicted a block diagram of an exemplary architecture for the listing sever 12. The listing server 12 may include a system bus 504 that interconnects various system components, including a system memory 502 to a processing unit 506. The processing unit 506 may comprise one processor or an array of processors. The processing unit 506 may be able to engage in parallel processing. The system bus 504 may be any of several types of bus structures including a memory bus or memory controller, a peripheral bus, and a local bus using any of a variety of bus architectures as is known to those skilled in the relevant art. The system memory 502 may include read only memory (ROM) 508 and random access memory (RAM) 510. A basic input/output system (BIOS) 512, containing the basic routines that help to transfer information between elements within the listing server 12, such as during start-up, is stored in ROM 508.

The listing server 12 may further include a hard disk drive 512 for reading and writing information to a hard disk (not shown) and an optical disk drive 514 for reading from or writing to a removable optical disk, such as a CD ROM, DVD, or other optical media. It will be appreciated that the hard disk drive 512 and optical disk drive 514 may be connected to the system bus 504 by a hard disk drive interface 516 and an optical disk drive interface 518, respectively. The drives and their associated computer-readable media provide nonvolatile storage of computer readable instructions, data structures, program product, and other data for the listing sever 12. The hard disk drive 512 may store databases and data sets. Computer software may be stored on the hard disk 512 and RAM 510, including an operating system 520, program product 522, and program data 524.

A user may enter commands and information into the listing server 12 through input devices such as a keyboard 526 and a pointing device, such as a mouse (not shown). These and other input devices are often connected to the processing unit 506 through a USB interface 526 that is coupled to the system bus 504. An output device 528, such as a computer monitor or other type of display device, is also connected to the system bus 504 via an interface, such as a video adapter 530.

The listing server 12 may operate in a networked environment using logical connections to one or more remote computers. The types of connections between networked devices include dial up modems, ISDN, DSL, cable modems, wireless and include connections spanning users connected to the Internet. The remote computer may be another personal computer, a server, a router, a network PC, a mobile device, such as mobile device 24, a peer device or other common network node, and typically includes many or all of the elements described above relative to the listing server 12 in FIG. 11. The logical connections depicted in FIG. 11 include a local area network (LAN) 532 and a wide area network (WAN) 534. Such networking environments are commonplace in offices, enterprise-wide computer networks, intranets, and the Internet.

When used in a LAN networking environment, the listing server 12 is connected to the local network 532 through a network interface or adapter 536. The listing server 12 may also connect to the LAN via through any wireless communication standard, such as the 802.11 wireless standard. When used in a WAN networking environment, the listing server 12 typically uses the network interface 536 as a means for establishing communications over the wide area network 534. The listing server 12 may also output audio sounds through speakers as illustratively shown by the box marked with the reference numeral 538 in FIG. 11. A sound card interface 540 processes the sounds to a sound card and the system bus 504.

Generally, the processing unit 506 of the listing server 12 is programmed by means of instructions stored at different times in the various computer-readable storage media of the computer. Programs and operating systems are typically distributed, on computer-readable mediums, for example, on CD-ROMs. From there, they are installed or loaded into the non-volatile memory of a computer, such as hard disk 512. At execution, they are loaded at least partially into the system memory 502, such as the RAM 510. It will be appreciated that the listing server 12 may comprise a single computer, such as the one illustrated in FIG. 11, or a plurality of computers.

In the foregoing Detailed Description, various features of the present disclosure are grouped together in a single embodiment for the purpose of streamlining the disclosure. This method of disclosure is not to be interpreted as reflecting an intention that the claimed disclosure requires more features than are expressly recited in each claim. Rather, as the following claims reflect, inventive aspects lie in less than all features of a single foregoing disclosed embodiment. Thus, the following claims are hereby incorporated into this Detailed Description of the Disclosure by this reference, with each claim standing on its own as a separate embodiment of the present disclosure.

It is to be understood that the above-described arrangements are only illustrative of the application of the principles of the present disclosure. Numerous modifications and alternative arrangements may be devised by those skilled in the art without departing from the spirit and scope of the present disclosure and the appended claims are intended to cover such modifications and arrangements. Thus, while the present disclosure has been shown in the drawings and described above with particularity and detail, it will be apparent to those of ordinary skill in the art that numerous modifications, including, but not limited to, variations in size, materials, shape, form, function and manner of operation, assembly and use may be made without departing from the principles and concepts set forth herein.

What is claimed is:

1. A method of posting listing content using a wireless mobile device, the method comprising:
   providing the wireless mobile device equipped with a mobile listing product, the mobile listing product creating a listing by the following method:
   (a) generating a user interface on a display of the wireless mobile device in an offline environment;
   (b) providing a selection of stock listing templates to the user on the wireless mobile device, each of the stock listing templates having stock listing content, including one or more of stock images, stock descriptions, and stock pricing information;
   (c) receiving a selection of one of the stock listing templates based upon user selection input entered through the wireless mobile device;
   (d) in response to user input received through the user interface in an offline environment, capturing listing content in a memory of the wireless mobile device, the captured listing content featuring information about a product, wherein the listing content includes at least one image that is captured via the mobile listing product;
   (e) in response to user input received through the user interface in an offline environment, receiving descriptive product information regarding the product in a memory of the wireless mobile device, wherein the at least one image is automatically associated with the descriptive product information by the mobile listing product;
   (f) transmitting the descriptive product information from the memory of the wireless mobile device to a computer server over a network;
   (g) in response to receiving the descriptive product information from the wireless mobile device, automatically generating, by the computer server, proposed listing content based on the descriptive product information, wherein the computer server also accesses a third party server to retrieve proposed listing content;
   (h) receiving proposed listing content for the product from the computer server over the network in the memory of the wireless mobile device;
   (i) displaying the proposed listing content for the product on the display of the wireless mobile device, the proposed listing content comprising comparative pricing information;
   (j) prompting a user to accept or reject the proposed listing content for inclusion in a listing with the captured listing content;
   (k) forming a communication with the captured listing content in a memory of the wireless mobile device in response to user input received through the user interface, said captured listing content being automatically included in the communication;
(l) transmitting said communication from the memory of the wireless mobile device to the computer server over a communications network;
(m) forming the listing, the listing comprising the proposed listing content accepted by the user and the captured listing content and the stock listing content of the stock listing template selected by the user;
(n) adding information to the listing by default as specified in listing preferences defined by the user and added to every listing of the user by default;
(o) posting the listing on a listing database accessible by a third party;
(p) imposing a limit on a number of listings allowed by the user at a given time;
(q) maintaining and tracking a user rating for the user based upon feedback information from third parties;
(r) increasing the limit on the number of listings allowed by the user at a given time based upon positive feedback;
(s) browsing multiple listings posted on the listing database by third parties; and
(t) interacting with the multiple listings posted on the listing database by third parties.

2. The method of claim 1, wherein the wireless mobile device comprises a camera and step (d) comprises capturing image data using the camera of the wireless mobile device and displaying the captured image data on the display of the wireless mobile device.

3. The method of claim 2, wherein step (d) further comprises capturing text data entered by a user.

4. The method of claim 3, further comprising automatically associating the captured image data and text data as listing content for a single listing.

5. The method of claim 1, wherein step (d) further comprises capturing the listing content as discrete data components.

6. The method of claim 5, further comprising automatically associating the discrete data components of the listing content.

7. The method of claim 6, wherein the discrete data components of the listing content comprise at least two of still image data, text data, video data and audio data.

8. The method of claim 1, wherein step (d) comprises:
displaying a live image feed on the display of the wireless mobile device;
capturing image data in the memory of the wireless mobile device; and
displaying the captured image data on the display of the wireless mobile device.

9. The method of claim 1, wherein step (d) comprises capturing listing content for multiple listings.

10. The method of claim 1, further comprising prompting a user to enter user account information through the user interface.

11. The method of claim 1, wherein step (k) comprises automatically transmitting the communication from the wireless mobile device to the computer server.

12. The method of claim 1, wherein step (k) comprises establishing a direct link between the wireless mobile device and the computer server and transmitting the communication over the direct link.

13. The method of claim 1, wherein said communication comprises an e-mail.

14. The method of claim 1, wherein said communication comprises one of an SMS message and an MMS message.

15. The method of claim 1, further comprising storing the listing content in the memory of the wireless mobile device in association with a unique listing ID.

16. The method of claim 1, wherein said communication further comprises user account information.

17. The method of claim 1, further comprising providing a preview of the listing on the display of the wireless mobile device.

18. The method of claim 1, wherein the communication formed at step (j) comprises listing content for multiple listings.

19. The method of claim 1, wherein said proposed listing content comprises one of comparative pricing information for the listing content, a proposed taxonomy or classification for the listing content, a proposed title for the listing content, a proposed description for the listing content, a proposed geographical location for the listing content, proposed stock images, and a proposed image for the listing content.

20. The method of claim 1, further comprising applying listing preferences to the listing content.

21. The method of claim 1, wherein the descriptive product information comprises a captured image of a machine-readable code.

22. A device for facilitating listing content generation, said device comprising:
a processor;
a memory coupled to said processor;
a display coupled to said processor; and
a set of computer-readable instructions stored in the memory for causing the processor to
generate a user interface on the display in an offline environment,
in response to user input received through the user interface in an offline environment, capture listing content in discrete data components, wherein the listing content includes at least one image that is captured via the device using the user interface,
in response to user input received through the user interface in an offline environment, receive descriptive product information; wherein the at least one image is automatically associated with the descriptive product information,
in response to receiving descriptive product information from the device, automatically generate, by a remote server, proposed listing content based on the descriptive product information, wherein the remote server also accesses a third party server to retrieve proposed listing content,
request and receive the automatically generated proposed listing content from the remote server based upon the descriptive product information wherein the remote server also accesses a third party server to retrieve proposed listing content,
prompt a user on the display to accept or reject the proposed listing content for inclusion in a listing with the captured listing content,
receive comparative pricing information from the remote server to assist the user in setting a price,
automatically form a communication comprising the discrete data components of the listing content in response to user input received through the user interface,
transmit the communication comprising the discrete data components of the listing content to a server,
post the listing on a listing database accessible by a third party, impose a limit on a number of listings allowed by the user at a given time, maintain and track a user rating for the user based upon feedback information from third parties, increase the limit on the number of listings allowed by the user at a given time based upon positive feedback, browse multiple listings posted on the listing database by third parties, and interact with the multiple listings posted on the listing database by third parties.

23. The device of claim 22, further comprising a camera for capturing image data and wherein one of the discrete data components of the listing content comprises image data captured by said camera.

24. The device of claim 22, wherein said communication comprises listing content for a plurality of listings.

25. The device of claim 22, wherein said discrete data components of the listing content comprise both image data and text data.

26. The device of claim 22, wherein said user interface comprises an image frame for displaying an image and one or more text boxes for receiving user input.

27. The device of claim 22, wherein said computer-readable instructions stored in the memory are further operable to cause the processor to automatically associate the discrete data components of the listing content.

28. The device of claim 22, wherein said computer-readable instructions stored in the memory are further operable to cause the processor to establish a direct link to the server for uploading the communication.

29. The device of claim 22, wherein said communication comprises an e-mail.

30. The method of claim 22, wherein said communication comprises one of an SMS message and an MMS message.

31. A device for facilitating listing content generation, said device comprising:
 a means for generating a user interface on a display of a wireless mobile device in an offline environment;
 a means for providing a selection of stock listing templates to the user on the wireless mobile device, each of the stock listing templates having stock listing content, including one or more of stock images, stock descriptions, and stock pricing information;
a means for selecting one of the stock listing templates based upon user selection input entered through the wireless mobile device;
 in response to user input received through the user interface in an offline environment, a means for capturing listing content as discrete data components with the wireless mobile device, wherein the listing content includes at least one image that is captured via the wireless mobile device;
 in response to user input received through the user interface in an offline environment, a means for receiving descriptive product information, wherein the at least one image is automatically associated with the descriptive product information;
 a means for transmitting the descriptive product information to a remote computer server;
 in response to receiving descriptive product information from the wireless mobile device, a means for automatically generating, by the remote server, proposed listing content based on the descriptive product information, wherein the remote server also accesses a third party server to retrieve proposed listing content,
 a means for receiving automatically generated proposed listing content from the remote computer server;

a means for displaying the proposed listing content on the display of the wireless mobile device;
 a means for prompting a user on the display of the wireless mobile device to accept or reject the proposed listing content for inclusion in a listing with the captured listing content;
 a means for automatically associating the discrete data components; a means for automatically forming a communication in response to user input received through the user interface, said communication comprising the listing content;
 a means for transmitting said communication from the wireless mobile device to a server;
 a means for posting the listing on a listing database accessible by a third party;
 a means for imposing a limit on a number of listings allowed by the user at a given time;
 a means for maintaining and tracking a user rating for the user based upon feedback information from third parties;
 a means for increasing the limit on the number of listings allowed by the user at a given time based upon positive feedback;
 a means for browsing multiple listings posted on the listing database by third parties; and
 a means for interacting with the multiple listings posted on the listing database by third parties.

32. The device of claim 31, further comprising a means for capturing image data and text data.

33. The device of claim 31, wherein said discrete data components of the listing content comprise both image data and text data.

34. The device of claim 31, further comprising a means of automatically associating image data and text data as listing content intended for a single listing.

35. A computer program product in a non-transitory computer-readable medium for facilitating listing content generation, the computer program product comprising:
 computer-usable program code for generating a user interface on a display of a wireless mobile device in an offline environment;
 computer-usable program code for providing a selection of stock listing templates to the user on the wireless mobile device, each of the stock listing templates having stock listing content, including one or more of stock images, stock descriptions, and stock pricing information;
 computer-usable program code for selecting one of the stock listing templates based upon user selection input entered through the wireless mobile device;
 in response to user input received through the user interface in an offline environment, computer-usable program code for capturing listing content in discrete data components, said listing content comprising image data and text data, wherein the listing content includes at least one image that is captured via the medium;
 in response to user input received through the user interface in an offline environment, computer-usable program code for receiving descriptive product information regarding the product in a memory of the wireless mobile device, wherein the at least one image is automatically associated with the descriptive product information by the mobile listing product;
 in response to receiving descriptive product information from the wireless mobile device, computer-usable program code for requesting automatically generated proposed listing content from a remote database based upon descriptive product information, wherein the computer-usable code also accesses a third party server to retrieve proposed listing content, computer-usable program code for receiving the automatically generated proposed listing content from the remote database;

computer-usable program code for displaying the proposed listing content on the display of the wireless mobile device;

computer-usable program code for prompting a user on the display of the wireless mobile device to accept or reject the proposed listing content for inclusion in a listing with the captured listing content;

computer-usable program code for automatically associating the discrete data components of the listing content;

computer-usable program code for automatically forming a communication comprising the listing content in response to user input received through the user interface;

computer-usable program code for transmitting the communication comprising the listing content from the wireless mobile device to a server;

computer-usable program code for imposing a limit on a number of listings allowed by the user at a given time;

computer-usable program code for posting the listing on a listing database accessible by a third party;

computer-usable program code for maintaining and tracking a user rating for the user based upon feedback information from third parties;

computer-usable program code for increasing the limit on the number of listings allowed by the user at a given time based upon positive feedback;

computer-usable program code for browsing multiple listings posted on the listing database by third parties; and computer-usable program code for interacting with the multiple listings posted on the listing database by third parties.

\* \* \* \* \*